US009529560B2

(12) United States Patent
Abe

(10) Patent No.: US 9,529,560 B2
(45) Date of Patent: Dec. 27, 2016

(54) INFORMATION PROCESSING APPARATUS, INFORMATION PROCESSING METHOD, AND PROGRAM

(75) Inventor: Koichi Abe, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 365 days.

(21) Appl. No.: 13/124,820

(22) PCT Filed: Oct. 20, 2009

(86) PCT No.: PCT/JP2009/005469
§ 371 (c)(1),
(2), (4) Date: Apr. 18, 2011

(87) PCT Pub. No.: WO2010/047083
PCT Pub. Date: Apr. 29, 2010

(65) Prior Publication Data
US 2011/0208881 A1 Aug. 25, 2011

(30) Foreign Application Priority Data

Oct. 21, 2008 (JP) .................................. 2008-271045
Jun. 25, 2009 (JP) .................................. 2009-151477

(51) Int. Cl.
G06F 3/00 (2006.01)
G06F 3/12 (2006.01)
G03G 15/00 (2006.01)

(52) U.S. Cl.
CPC ......... *G06F 3/1285* (2013.01); *G03G 15/5083* (2013.01); *G03G 15/5091* (2013.01);
(Continued)

(58) Field of Classification Search
None
See application file for complete search history.

(56) References Cited

U.S. PATENT DOCUMENTS 5,692,111 A * 11/1997 Marbry et al. ............... 358/1.15
5,699,495 A * 12/1997 Snipp .......................... 358/1.15
(Continued)

FOREIGN PATENT DOCUMENTS

CN 101100141 A 1/2008
CN 101102384 A 1/2008
(Continued)

Primary Examiner — Henry Tsai
Assistant Examiner — Christopher Bartels
(74) Attorney, Agent, or Firm — Canon USA, Inc. I.P. Division

(57) ABSTRACT

A system is proposed, which provides a device management application that provides an appropriate display or function in accordance with an environment in which a user uses the system, which automatically fits to an environment in which a user uses the system, and which has an excellent operability.

Whether or not a default device exists among devices associated with a device management application is determined. When it is determined that the default device exists among the devices associated with the device management application, a friendly name of the default device is displayed in a device name display part of the device management application. When it is determined that no default device exists among the devices associated with the device management application, a device name of any one of the devices associated with the device management is displayed in the device name display part of the device management application.

33 Claims, 24 Drawing Sheets

(52) U.S. Cl.
CPC .......... *G06F 3/1204* (2013.01); *G06F 3/1226* (2013.01); *G06F 3/1229* (2013.01); *G06F 3/1232* (2013.01); *G03G 15/502* (2013.01); *G03G 2215/00109* (2013.01)

(56) References Cited

U.S. PATENT DOCUMENTS

| | | | |
|---|---|---|---|
| 6,587,126 B1* | 7/2003 | Wakai | G06F 3/1296 358/1.13 |
| 6,825,941 B1* | 11/2004 | Nguyen | G06F 3/1227 358/1.13 |
| 7,168,003 B2* | 1/2007 | Lozano et al. | 714/25 |
| RE39,801 E* | 8/2007 | Marbry | G06F 3/1297 358/1.15 |
| 7,353,373 B2* | 4/2008 | Olbricht | 713/1 |
| 7,480,745 B2* | 1/2009 | Dahneke et al. | 710/15 |
| 7,509,417 B1* | 3/2009 | Kammer et al. | 709/225 |
| 2002/0174073 A1* | 11/2002 | Nordman et al. | 705/64 |
| 2003/0187922 A1* | 10/2003 | Ohara | 709/203 |
| 2003/0227641 A1* | 12/2003 | Edmonds | G06F 3/1204 358/1.13 |
| 2003/0231329 A1* | 12/2003 | Edmonds | G06F 3/1204 358/1.13 |
| 2004/0019689 A1* | 1/2004 | Fan | H04L 29/06 709/230 |
| 2004/0136023 A1* | 7/2004 | Sato | G06F 3/1205 358/1.13 |
| 2004/0203358 A1* | 10/2004 | Anderson et al. | 455/41.1 |
| 2005/0024671 A1* | 2/2005 | Abe | 358/1.13 |
| 2005/0086282 A1* | 4/2005 | Anderson | G06F 17/30899 709/200 |
| 2005/0097087 A1* | 5/2005 | Punaganti Venkata et al. | 707/3 |
| 2005/0111856 A1* | 5/2005 | Kawai | 399/8 |
| 2005/0157321 A1* | 7/2005 | Alacar | 358/1.13 |
| 2006/0037028 A1* | 2/2006 | Adermann et al. | 719/321 |
| 2006/0077413 A1* | 4/2006 | Lum et al. | 358/1.13 |
| 2006/0077421 A1* | 4/2006 | Eden | H04N 1/00204 358/1.15 |
| 2007/0002355 A1* | 1/2007 | Kai | 358/1.13 |
| 2007/0038667 A1* | 2/2007 | Abe | 707/103 R |
| 2007/0245039 A1* | 10/2007 | Dahneke et al. | 710/15 |
| 2007/0284441 A1* | 12/2007 | Walczyk et al. | 235/383 |
| 2008/0007771 A1 | 1/2008 | Kanamori | |
| 2008/0052384 A1* | 2/2008 | Marl et al. | 709/223 |
| 2008/0140835 A1* | 6/2008 | Bradley et al. | 709/225 |
| 2008/0207129 A1* | 8/2008 | Page et al. | 455/41.3 |
| 2009/0303521 A1* | 12/2009 | Kumar | 358/1.15 |

FOREIGN PATENT DOCUMENTS

| | | |
|---|---|---|
| EP | 1460529 A2 | 9/2004 |
| JP | 2001-007824 A | 1/2001 |
| JP | 2001-028597 A | 1/2001 |
| JP | 2003-084942 A | 3/2003 |
| JP | 2003-150469 A | 5/2003 |
| JP | 2006-185251 A | 7/2006 |
| JP | 2006-243907 A | 9/2006 |
| JP | 2008-077487 A | 4/2008 |
| JP | 2008-152762 A | 7/2008 |
| JP | 2008-168600 A | 7/2008 |
| WO | 01/41099 A1 | 6/2001 |
| WO | 02/28022 A2 | 4/2002 |

* cited by examiner

←→ INDICATES ADDRESS/DATA BUS

FIG. 8

```xml
<?xml version="1.0" encoding="utf-8"?>
<dm:deviceManagement xmlns:dm="http://abc.xxx/dm/control">
  <dm:manufacturer>ABC</dm:manufacturer>
  <dm:model>Kmmn</dm:model>
  <dm:deviceNameControl>
    <dm:defaultName>ABC Kmmn</dm:defaultName>
  </dm:deviceNameControl>
  <dm:priorityOrder>
    <dm:driverName>ABC Kmmn (Printer)</dm:driverName>
    <dm:order>1</dm:order>
  </dm:priorityOrder>
  <dm:priorityOrder>
    <dm:driverName>ABC Kmmn (FAX)</dm:driverName>
    <dm:order>2</dm:order>
  </dm:priorityOrder>
  <dm:functions>
    <dm:function>
      <dm:name xml:lang="en-US">Open Printer Queue</dm:name>
      <dm:execute>openPrinterQueue</dm:execute>
    </dm:function>
    <dm:function>
      <dm:name xml:lang="en-US">Printing Preferences</dm:name>
      <dm:execute>printingPreferences</dm:execute>
    </dm:function>
  </dm:functions>
</dm:deviceManagement>
```

FIG. 17

```
typedef struct _PRINTER_INFO {
        LPTSTR       pPrinterName;
        LPTSTR       pPortName;
        LPTSTR       pDriverName;
        DWORD        Status;
} PRINTER_INFO, *PPRINTER_INFO;
```

FIG. 18A

| pPrinterName | ABC Kmmn (Printer) |
|---|---|
| pPortName | USB001 |
| pDriverName | ABC Kmmn (Printer) |
| Status | 0 |

FIG. 18B

| pPrinterName | ABC Kmmn (FAX) |
|---|---|
| pPortName | USB002 |
| pDriverName | ABC Kmmn (FAX) |
| Status | 0 |

FIG. 18C

| pPrinterName | ABC Kmmn (Printer) |
|---|---|
| pPortName | USB001 |
| pDriverName | ABC Kmmn (Printer) |
| Status | 0 |

FIG. 18D

| pPrinterName | Koichi's FAX |
|---|---|
| pPortName | USB002 |
| pDriverName | ABC Kmmn (FAX) |
| Status | 0 |

UI MODULE 35

UI MODULE 135

INFORMATION PROCESSING APPARATUS, INFORMATION PROCESSING METHOD, AND PROGRAM

TECHNICAL FIELD

The present invention relates to an information processing apparatus, an information processing method, and a program for managing peripheral devices.

BACKGROUND ART

In recent years, peripheral-device control systems in which peripheral devices are connected to an information processing apparatus by utilizing various types of interfaces such as universal serial bus (USB), Ethernet (registered trademark), and a wireless local area network (LAN) have been effectively used in various forms at home and office. Examples of a peripheral device include a printer, a facsimile machine, a scanner, a digital camera, a device having a multiple function of a printer, a facsimile machine, a scanner, and a digital camera, and so forth.

A device management application that manages peripheral devices exists as an example of a peripheral-device control system. By utilizing the device management application, a setting of a device or device driver can be changed, and an operation state of a device can be monitored.

Furthermore, when a printer is provided as an example of a peripheral device, an application that can print an image or document can be activated from the device management application. Additionally, when a scanner is provided as an example of a peripheral device, an application that can read an image or document can also be activated from the device management application.

As the Internet becomes widespread, an information processing apparatus and peripheral devices are connected to the Internet, and various types of online services utilizing the Internet are also provided. For example, a user can obtain, using the device management application, a link to an online service that is associated with a device.

Here, a multifunction printer in which a printer, a facsimile (FAX) machine, a scanner, and a storage device are mounted (hereinafter, referred to as an "MFP" in some cases) is provided as an example of a peripheral device. Both a driver that controls a printer function and a driver that controls a FAX function are printer class drivers, and are installed in an information processing apparatus as different drivers. As a result, a printer icon representing the printer (the driver for the printer function) and a FAX icon representing the FAX (the driver for the FAX function) are displayed as icons having different names on a printer queue. Accordingly, a device management application for the MFP needs to appropriately manage the two drivers. However, control of determining which priority is to be assigned to which driver or the like is not appropriately performed, and priorities of the drivers are simply determined in accordance with an order of installation of the drivers or the like. Moreover, a device name that is to be displayed in a device name display part of the device management application is not appropriately determined. Thus, a device name that is to be displayed in the device name display part is simply determined in accordance with an order of installation of the drivers or the like, and the device name is displayed.

As an example of the related art, a technique such as a technique disclosed in PTL exists.

CITATION LIST

Patent Literature

PTL 1: Japanese Patent Laid-Open No. 2003-084942

The present invention aims to focus on the following problems in a case in which a plurality of device drivers are associated to one peripheral device, and to solve the problems.

(1) A problem that a device name which is to be displayed in a device name display part of a device management application is not appropriate.

(2) A problem that a driver which is associated with each function that is to be performed using a device management application is not appropriate.

Here, in the above-described example of the MFP, an example is considered, in which a user mainly uses the printer function. In an environment in which the user uses the MFP, it is desirable that an appropriate name indicating the printer function or a printer (driver) name be displayed in the device name display part of the device management application. For example, when the user customizes a printer icon name (friendly name) so that the friendly name of the printer icon is changed to a friendly name such as "Koichi's Printer", it is desirable that the friendly name be displayed in the device name display part of the device management application. For example, the user does not customize the printer icon name, it is desirable that a model name of the MFP or the like be displayed in the device name display part. Furthermore, each of the functions of the MFP is classified as the main function or a sub-function, it is desirable that a driver name or friendly name which indicates the main function be displayed in the device name display part.

Similar issues are considered for a function of chaining a setting of a device driver on the device management application or a function of monitoring an operation state of a device. For example, when an operation of opening a printer queue on the device management application is performed, in a case in which a plurality of printer queues that are associated with the device management application exist, it is desirable that a printer queue for a device which is set as a default device be preferentially opened. Additionally, similarly, also for setting (print setting) of a device driver, it is desirable that a print setting dialog for a driver which is set as a default device (printer) be preferentially displayed.

SUMMARY OF INVENTION

The present invention focuses on the problems of the above-described example of the related art, and proposes a system which provides a device management application that provides an appropriate display or function in accordance with an environment in which a user uses the system, which automatically fits to an environment in which the user uses the system, and which has an excellent operability.

An information processing apparatus according to an embodiment of the present invention includes the following elements: a determination unit configured to determine whether or not a default device exists among devices that are associated with a device management application; and a display unit configured to display, when it is determined by the determination unit that the default device exists among the devices which are associated with the device management application, a friendly name of the default device in a device name display part of the device management application, and configured to display, when it is determined by the determination unit that no default device exists among the devices which are associated with the device management application, a friendly name of any one of the devices that are associated with the device management application in the device name display part of the device management application.

BRIEF DESCRIPTION OF DRAWINGS

FIG. 8 is an illustration showing the contents of a device management control file.

FIG. 17 is an illustration showing a PRINTER_INFO structure.

FIG. 18A is an illustration showing information that is set in a PRINTER_INFO structure.

FIG. 18B is an illustration showing information that is set in a PRINTER_INFO structure.

FIG. 18C is an illustration showing information that is set in a PRINTER_INFO structure.

FIG. 18D is an illustration showing information that is set in a PRINTER_INFO structure.

FIG. 21A is a flowchart of a process for the initialization event when the printer driver 50 is installed.

DESCRIPTION OF EMBODIMENTS

First Embodiment

Hereinafter, embodiments of the present invention will be described with reference to the accompanying drawings.

Figure 1:
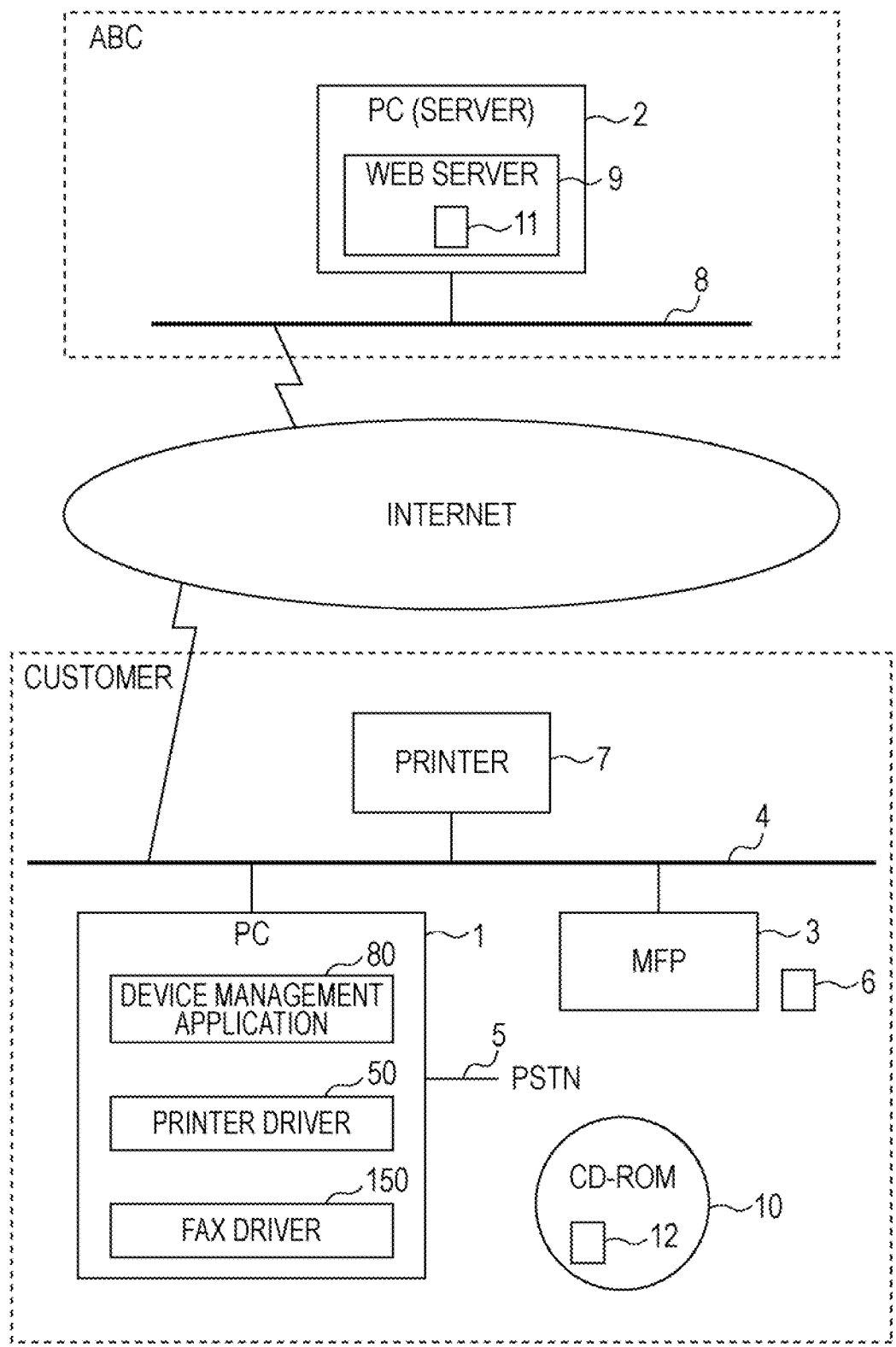
FIG. 1 is a block diagram of a system configuration of a peripheral-device control system, which includes an information processing apparatus according to a first embodiment of the present invention and peripheral devices, in the first embodiment.

From information concerning Windows (registered trademark) Vista OS that is cited below, information to which no detail description is particularly added is disclosed at Microsoft Developer Network (MSDN) site as of Sep. 29, 2008. The uniform resource locator (URL) of the MSDN site on the Internet is as follows. http://msdn.microsoft.com/en-us/library/default.aspx FIG. 1 is a block diagram of a system configuration of a peripheral-device control system, which includes an information processing apparatus according to a first embodiment of the present invention and peripheral devices, in the first embodiment. In FIG. 1, reference numerals 1 and 2 denote information processing apparatuses, and the information processing apparatuses are configured using typical personal computers (hereinafter, referred to as "PCs" in some cases). The PCs 1 and 2 are configured using hardware that is described below with reference to FIG. 2A. As an operating system (OS), an OS that is equivalent to Windows (registered trademark) Vista OS made by U.S. Microsoft Corporation is installed in the PCs 1 and 2. The PCs 1 and 2 are connected to networks 4 and 8, which are configured using Ethernet (registered trademark), respectively. Reference numeral 3 denotes an MFP. The MFP 3 is configured using a color inkjet printer a color facsimile machine, a color scanner, an external storage device for a flash memory, and so forth, and is an example of a peripheral device in the first embodiment of the present invention: The MFP 3 is an MFP that is made by ABC Corporation and that has a model name "Kmmn". The main function of the MFP 3 is a printer function, and a facsimile function and a scanner function are sub-functions. Note that, as the peripheral device in the first embodiment of the present invention, a printer, a copier, a facsimile machine, a scanner, a digital camera, a device having a multiple function of a printer, a copier, a facsimile machine, a scanner, and a digital camera, or the like may be used. The MFP 3 is configured using hardware as described below with reference to FIG. 2B. The MFP 3 is connected to the PC 1 via the network 4, and the MFP 3 and the PC 1 can perform mutual communication between them. Reference numeral 80 denotes an application, and is configured using an executable file (*.EXE) for Windows (registered trademark). As an example of an application in the first embodiment of the present information, the application 80 is a device management application such as a device management application shown in FIG. 7A. Reference numeral 50 denotes a printer driver such as a printer driver shown in FIG. 4. Reference numeral 150 denotes a FAX driver such as a FAX driver shown in FIG. 14. The network 4 is a home network for an ordinary home, and is structured at home where a user (a customer) using the MFP 3 lives. The MFP 3 is connected to the PC 1 via the network 4 in the home, and shared and used among family members. The network 8 is an office network that is structured in ABC Corporation. The PC 2 that is connected to the network 8 includes a web server 9 having a web server function, and provides a website of ABC Corporation on the Internet. Reference numeral 10 denotes a compact disc read-only memory (CD-ROM) that can be inserted into the PC 1, and software and electronic files are stored on the CD-ROM 10. Reference numerals 11 and 12 are device management control files that are described below with reference to FIG. 8, and are distributed from the web server 9 or the CD-ROM 10. Reference numeral 5 denotes an analog telephone line. and is used for facsimile transmission/reception that is performed by the PC 1. Reference numeral 6 denotes a flash memory, and can be referred to as a storage device from the PC 1 by being mounted into a slot (omitted in FIG. 1) of the MFP 3 that is used to mount a flash memory. Reference numeral 7 denotes a printer. The printer 7 is made by XYZ Corporation, and has a model name "Defg". The printer 7 is a device that is totally different from the MFP 3.

Figure 2A:
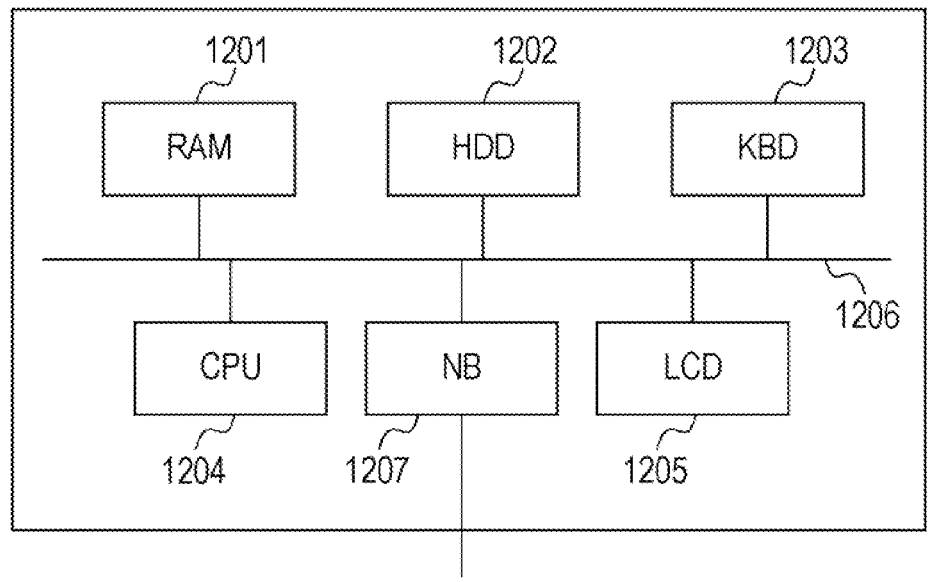
FIG. 2A is a block diagram showing an example of a hardware configuration of a PC.

FIG. 2A is a block diagram showing an example of a hardware configuration of a PC. The PCs 1 and 2 are configured using hardware such as hardware shown in FIG. 2A. Referring to FIG. 2, the hardware configuration of a PC is described as an example of a hardware configuration of the PC 1.

Figure 3:
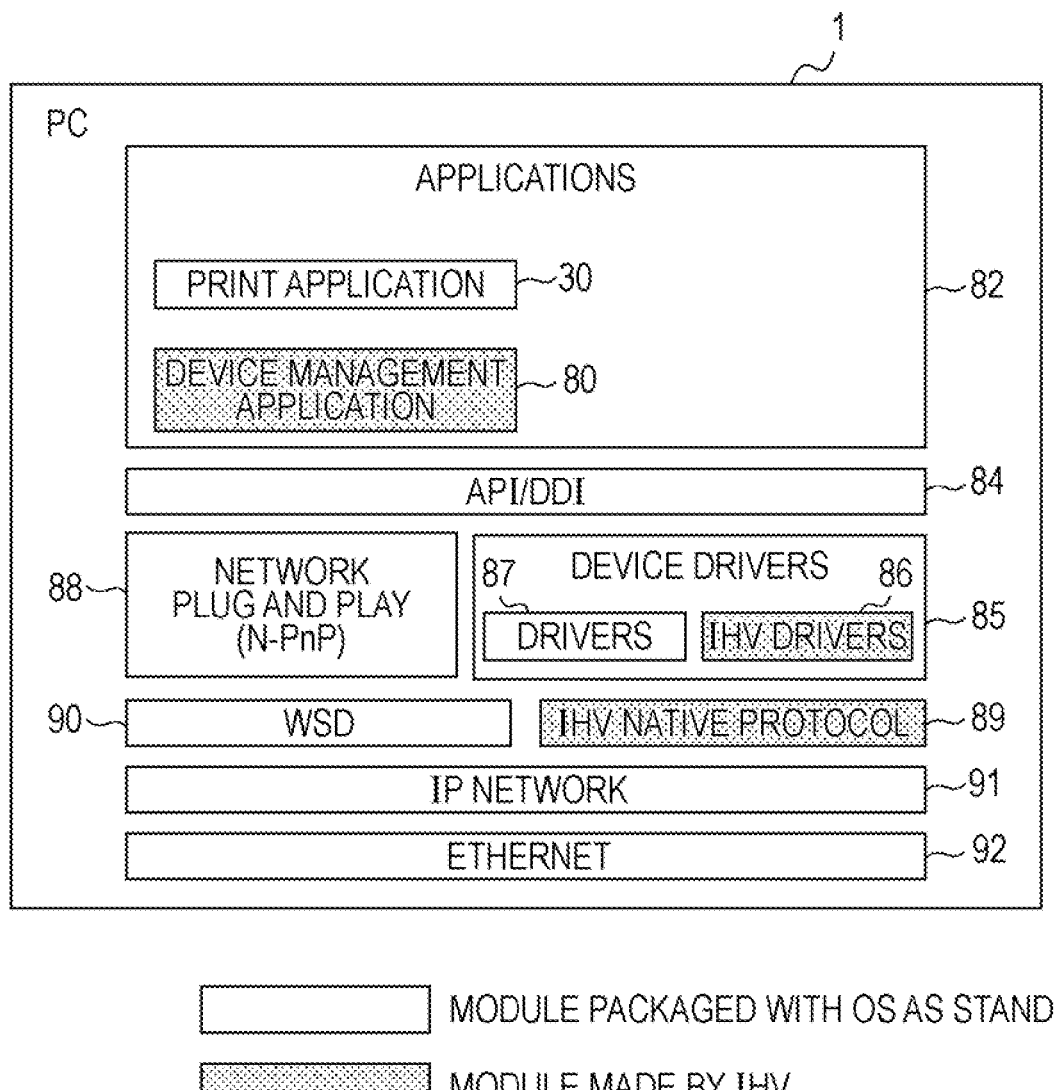
FIG. 3 is a diagram of a software configuration of the PC.
Figure 4:
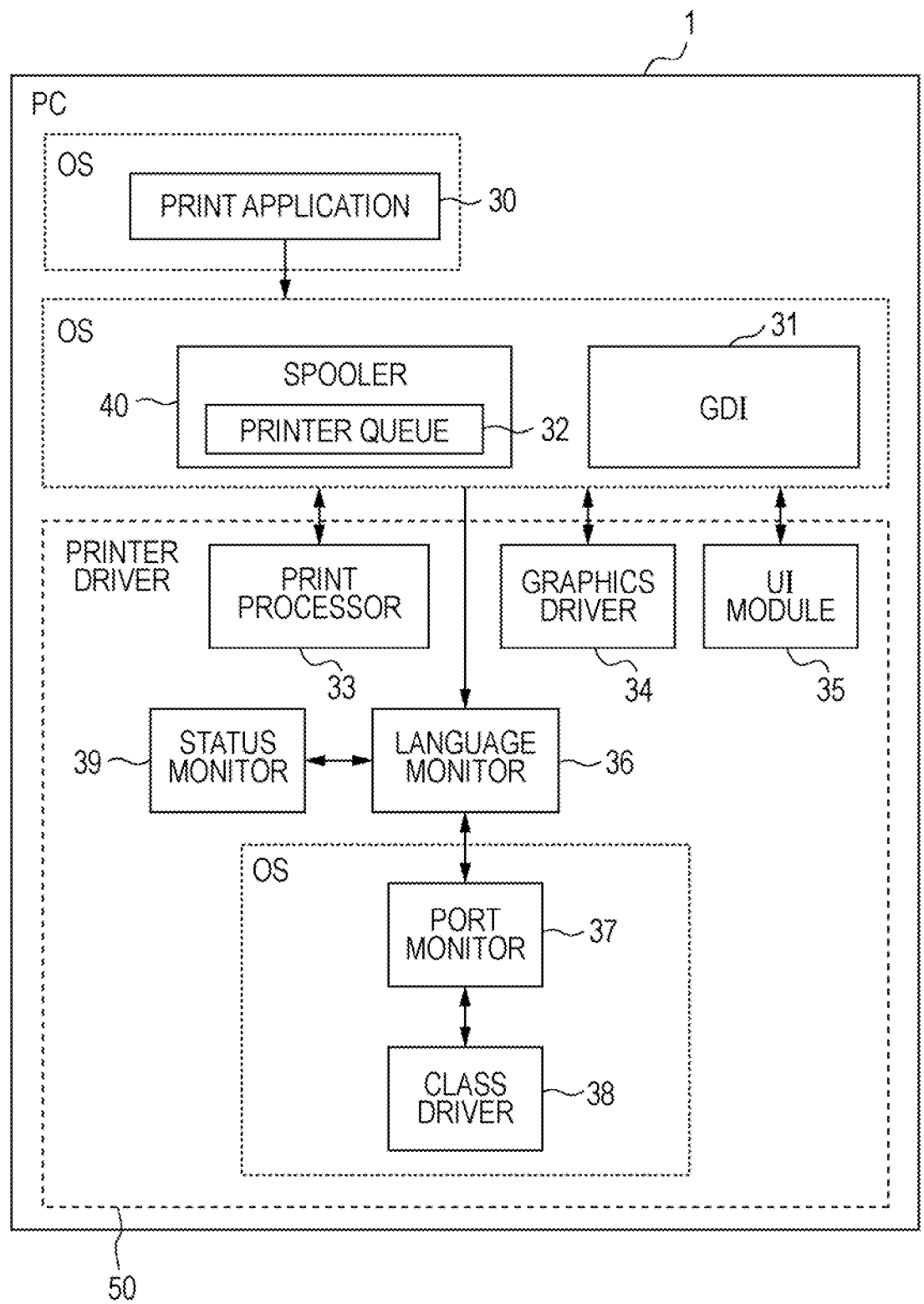
FIG. 4 is a diagram of a configuration of a printer driver 50 in the PC.
Figure 14:
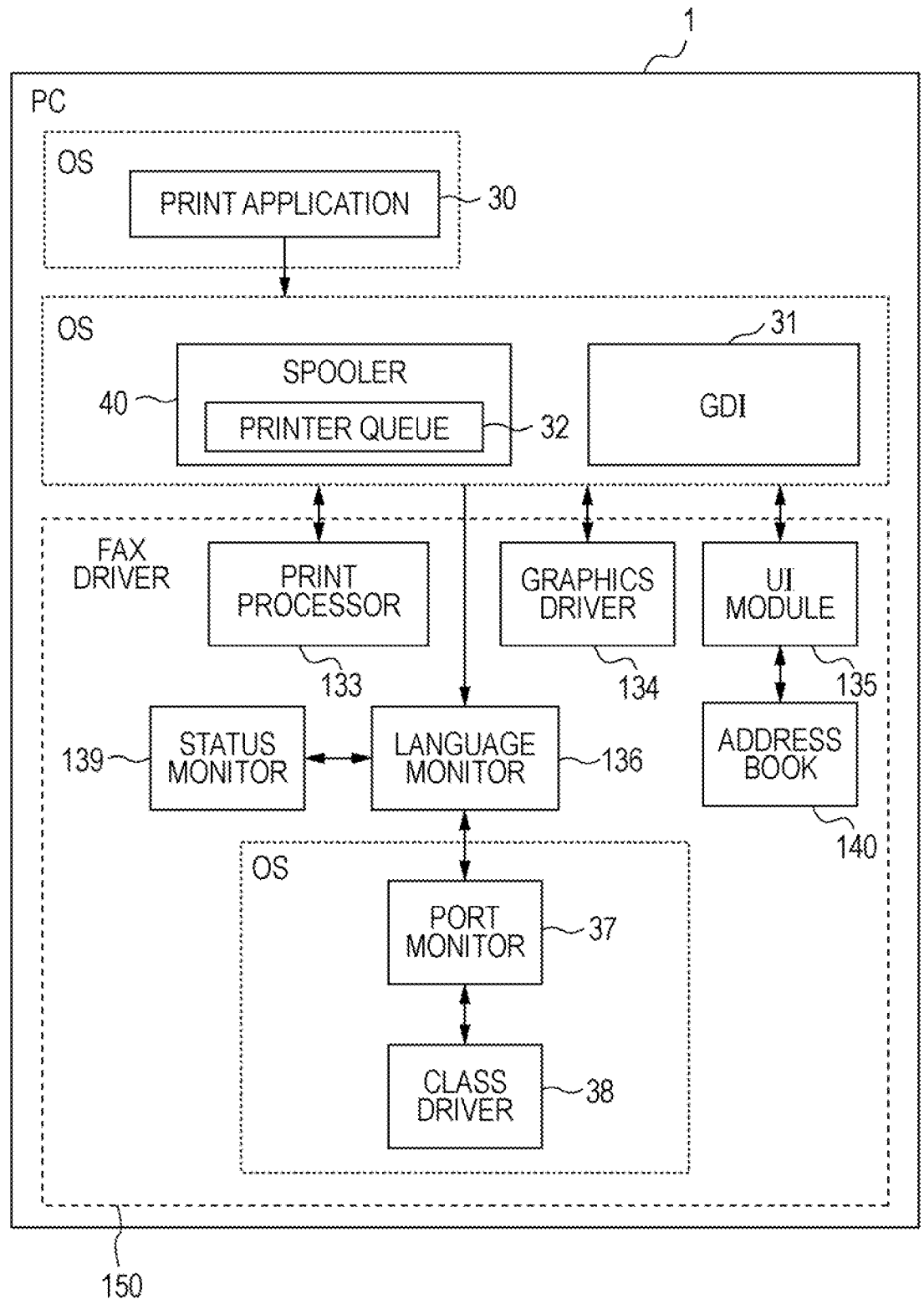
FIG. 14 is a diagram of a configuration of the FAX driver 150 in the PC.

As shown in FIG. 2A, the PC 1 includes a random-access memory unit (a random-access memory (RAM) 1201), a hard disk drive unit (a hard disk drive (HDD) 1202) that is a storage unit, a keyboard unit (a keyboard device (KBD) 1203) that is an example of an input unit, and a central processing unit (CPU) 1204 that is a control unit. Furthermore, the PC 1 includes a display (a liquid crystal display (LCD) 1205) that is an example of a display unit, a network board (a network board (NB) 1207) that is an example of a communication control unit, and a bus 1206 that connects the above-mentioned elements of the PC 1 to one another. Moreover, the storage unit may be a portable CD-ROM, a built-in read-only memory (ROM), or the like. Applications including the application 80 and so forth, and individual modules (software) that are shown in FIGS. 3, 4, and 14 are stored on the HDD 1202. The applications and modules are, on an as needed basis, read into the RAM 1201, and executed by the CPU 1204. Accordingly, the CPU 1204 realizes functions of the applications including the application 80 and so forth, and functions of the individual modules (software) that are shown in FIGS. 3, 4, and 14.

Figure 2B:
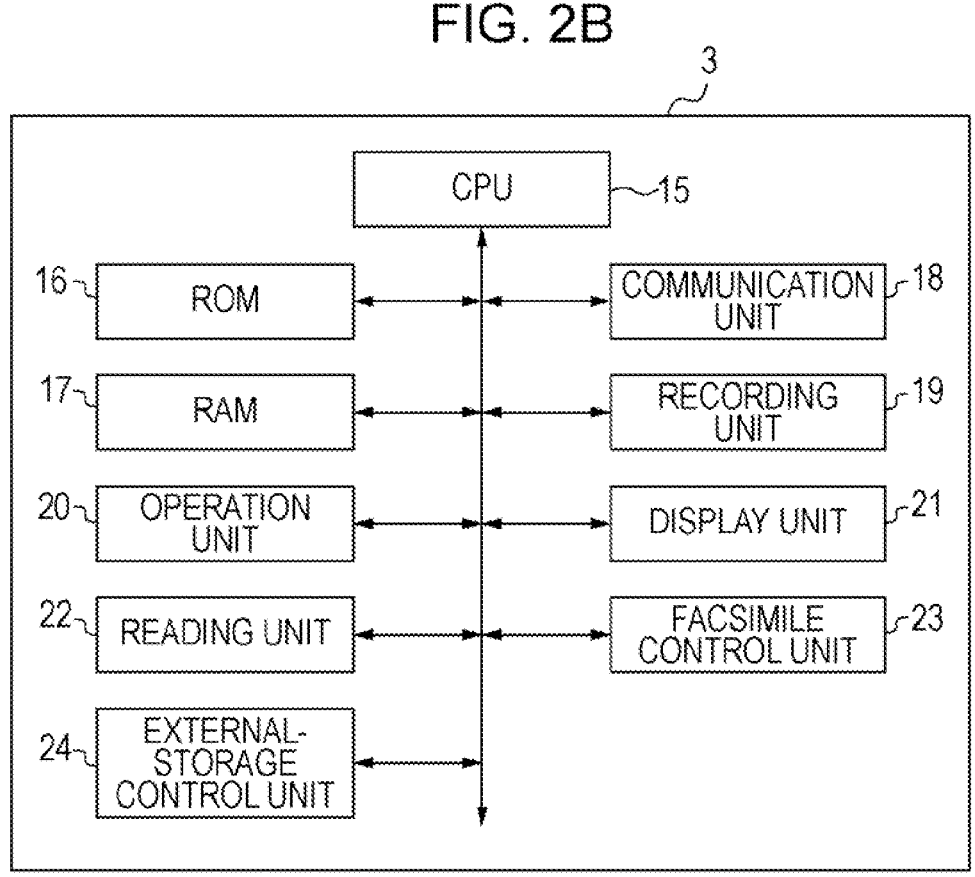
FIG. 2B is a block diagram showing an example of a hardware configuration of an MFP.

FIG. 2B is a block diagram of a hardware configuration of an MFP. The MFP 3 has a hardware configuration such as the hardware configuration shown in FIG. 2B. In FIG. 2B, reference numeral 15 denotes a CPU that is configured using a microprocessor or the like. The CPU 15 serving as a central processing unit of the MFP 3 controls an RAM 17, a communication unit 18, a recording unit 19, an operation unit 20, a display unit 21, a reading unit 22, a facsimile control unit 23, and an external-storage control unit 24 in accordance with a program that is stored in an ROM 16. In the ROM 16, programs are stored. With the programs, the MFP 3 performs, in accordance with control that is performed by the printer driver 50 (which is described below with reference to FIG. 4), a recording (printing) process and a process of transmitting a status to the PC 1. In the ROM 16, other programs are also stored. With the programs, the MFP 3 performs, in accordance with control that is performed by the FAX driver 150 (which is described below with reference to FIG. 14), a facsimile transmission/reception process and a process of transmitting a state of facsimile transmission/reception to the PC 1. In the RAM 17, mainly, print data is temporarily stored in the RAM 17. The print data is transmitted from the PC 1, and printing is performed by the recording unit 19 in accordance with the print data. Moreover, in the RAM 17, image data that is read by the reading unit 22, transmission data for facsimile communication that is transmitted from the PC 1, reception data for facsimile communication that is received by the facsimile control unit 23, and so forth are also temporarily stored. The communication unit 18 includes a connection port for the network 4, a connection port for the analog telephone line 5, and so forth. The communication unit 18 controls Ethernet (registered trademark) and analog communication for facsimile transmission/reception. The recording unit 19 includes a recording part and an electric circuit. The recording part includes inkjet recording heads, individual color inks, a carriage, a mechanism for conveying a recording sheet, and so forth. The electric circuit is configured using an application-specific integrated circuit (ASIC) for generating printing pulses in the recording heads in accordance with the above-mentioned print data, or the like. With a printing operation or an facsimile transmission operation that is performed using an application capable of printing, the display contents (image data) of a file that is opened by the application is temporarily stored as a spool file in an enhanced meta file (EMF) format on the HDD 1202 of the PC 1. The image data is converted into print data or transmission data for facsimile communication by the printer driver 50 or the FAX driver 150. The print data and the transmission data for facsimile communication include commands for controlling the MFP 3. After that, the print data or the transmission data for facsimile communication is transmitted to the MFP 3 via the network 4. The print data that is received by the MFP 3 is converted into printing pulses by the recording unit 19, and printed on a recording sheet. The transmission data for facsimile communication, which is received by the MFP 3, is converted into a facsimile communication protocol by the facsimile control unit 23, and transmitted to a facsimile device of a communication partner via the analog telephone line 5. Reference numeral 20 denotes an operation unit. The operation unit 20 includes various types of buttons such as a power supply button and a reset button, and the MFP 3 can be operated using the operation unit 20. Reference numeral 21 denotes a display unit. The display unit 21 is configured using a liquid crystal display having a touch panel. The display unit 21 can display the state of the MFP 3. Additionally, the display unit 21 can display various types of settings or a phone number, and the various types of settings or a phone number can be input on the display unit 21. Reference numeral 22 denotes a reading unit 22, and the reading unit 22 includes a color image sensor and an electric circuit that is configured using an ASIC for image processing or the like. Reference numeral 23 is a facsimile control unit. The facsimile control unit 23 includes a modem for facsimile communication, a circuit for analog communication, and so forth, and controls facsimile transmission/reception in accordance with a facsimile communication protocol. Reference numeral 24 is an external-storage control unit. The external-storage control unit 24 includes a slot for mounting a flash memory, an interface circuit for a storage device, and so forth, and controls a mounted flash memory.

FIG. 3 is a diagram of a software configuration of the PC. In FIG. 3, reference numeral 92 denotes an Ethernet (registered trademark) control stack that controls Ethernet (registered trademark). Reference numeral 91 denotes an Internet protocol (IP) network control stack that controls an IP network. Reference numeral 90 is a web services on devices (WSD) control stack that controls WSD. Reference numeral 89 denotes an independent hardware vendor (IHV) native protocol control stack that controls an IHV-specific protocol. Reference numeral 88 denotes a network plug-and-play (hereinafter, referred to as an "N-PnP" in some cases) control stack that controls N-PnP.

Note that plug-and-play extensions (PnP-X) exist as a series of extension functions of plug and play. The PnP-X provide support for a device that is connected to a network, and are included in Windows (registered trademark) Vista OS as standard. However, in the first embodiment, an example is described, in which the N-PnP is utilized as a function that is equivalent to the PnP-X. Reference numeral 85 denotes a group of device drivers. The group of device drivers 85 includes a group of standard drivers 87 that is packaged with the OS as standard, and a group of IHV-made drivers 86 that is provided from an IHV. Reference numeral 84 denotes an application programming interface (API)/device driver interface (DDI), and the API/DDI 84 includes an API and a DDI. Reference numeral 80 denotes an application, and the application 80 is a device management application that is packaged with the OS as standard. Reference numeral 30 is an application capable of printing, which is described below with reference to FIG. 4. Reference numeral 82 is a group of applications, and the group of applications 82 includes the device management application 80, a print application 30, and so forth. The device management application 80 can display a printer queue button 42 and a print setting button 43, which are described below with reference to FIG. 7A, through the API/DDI 84.

Figure 15A:
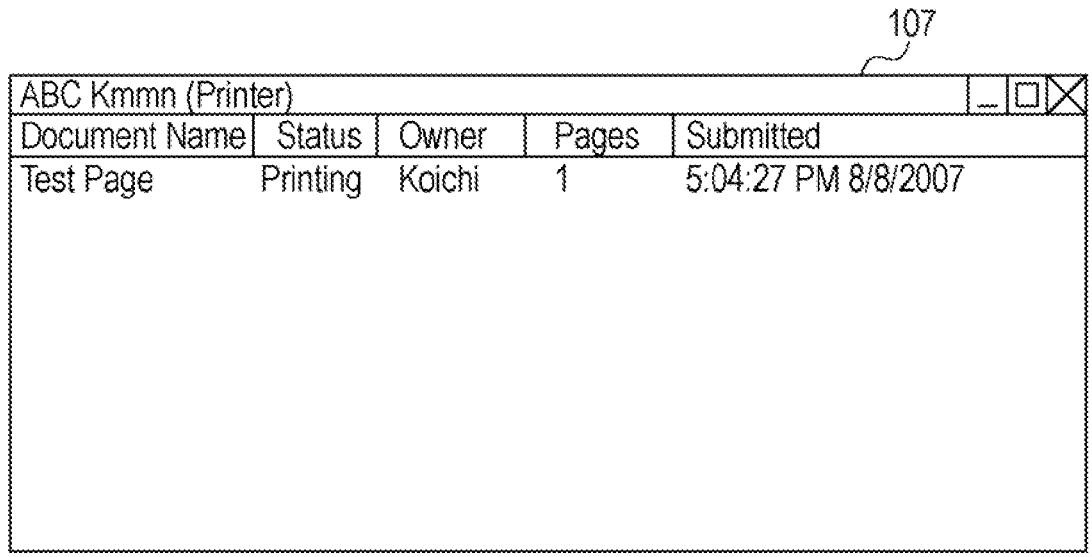
FIG. 15A is an illustration of a printer queue folder.

FIG. 4 is a diagram of a configuration of a printer driver in the PC. In FIG. 4, reference numeral 50 denotes a printer driver for the MFP 3 that is installed in the PC 1, and the printer driver 50 includes a plurality of modules 33 to 36 and 39. Reference numeral 30 denotes an application capable of printing. For example, the print application 30 corresponds to Notepad (Notepad. exe) that is a text editor which is packaged with the OS as standard, or the like. Reference numeral 31 denotes a graphics device interface (GDI), and the GDI 31 is one portion of the OS. Reference numeral 32 denotes a printer queue. The printer queue 32 is configured as one portion of a spooler 40, and print jobs are queued. The queued print jobs are displayed in a printer queue folder 107 that is shown in FIG. 15A. Reference numeral 33 denotes a print processor. The print processer 33 changes a print layout, and performs a special process on an image to be printed. Reference numeral 34 is a graphics driver. The graphics driver 34, which servers as the core of the printer driver 50 for image processing, performs image processing for printing in accordance with a render instruction that is transmitted from the GDI 131, and generates a print control command. Reference numeral 35 denotes a user interface (UI) module, and the UI module 35 supplies and controls a user interface for the printer driver 50. Reference numeral 36 denotes a language monitor, and the language monitor 36, which serves as a data communication interface (I/F), controls transmission and reception of data. Reference numeral 39 denotes a status monitor, and the status monitor 39 displays a remaining amount of ink in the MFP 3 and a status of the MFP 3 such as a warning status or an error status. Reference numeral 37 denotes a port monitor. The port monitor 37 performs a process of transmitting, to an appropriate port, data that is transmitted from the language monitor 36, and a process of receiving, via a class driver 38, data that is transmitted from the MFP 3. Reference numeral 38 denotes a class driver, and the class driver 38 is a low-level module that is closest to ports. In the first embodiment of the present invention, the class driver 38 corresponds to a printer class driver for the WSD or for the IHV-specific protocol, and controls ports (network ports in the first embodiment of the present invention). The printer driver 50 is a printer driver made by ABC Corporation that is a manufacturer of the MFP 3.

Figure 15B:
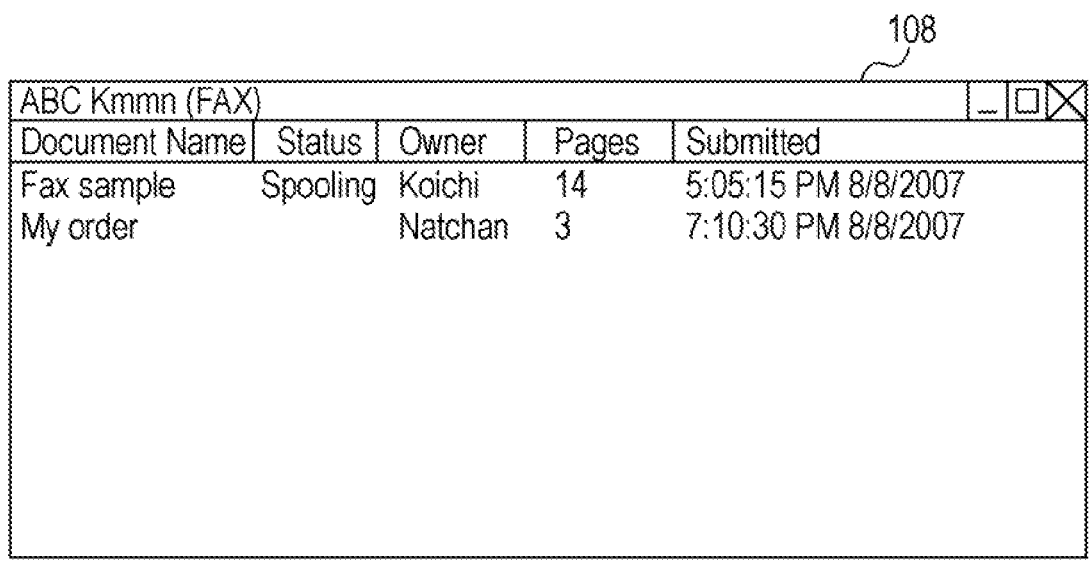
FIG. 15B is an illustration of a printer queue folder.

FIG. 14 is a diagram of a configuration of the FAX driver in the PC. The FAX driver corresponds to a printer class driver. Because a facsimile transmission job is treated as a print job in the OS, hereinafter, a facsimile transmission job is referred to as a "print job" in some cases. In FIG. 14, reference numeral ISO denotes a FAX driver for the MFP 3, which is installed in the PC 1, and the FAX driver 150 includes a plurality of modules 133 to 136, and 139. Reference numeral 30 denotes a print application capable of printing, and, for example, the print application 30 corresponds to Notepad (Notepad. exe), which is a text editor that is packaged with the OS as standard, or the like. Reference numeral 31 denotes a GDI, and the GDI 31 is one portion of the OS. Reference numeral 32 denotes a printer queue. The printer queue 32 is configured as one portion of a spooler 40, and print jobs (facsimile transmission jobs) are queued. The queued print jobs are displayed in a printer queue folder 108 that is shown in FIG. 15B. Reference numeral 133 denotes a print processor. The print processer 133 changes a layout of an image that is to be transmitted by facsimile, and performs a special process on an image that is to be transmitted by facsimile. Reference numeral 134 is a graphics driver. The graphics driver 134, which servers as the core of the FAX driver 150 for image processing, performs image processing for facsimile transmission in accordance with a render instruction that is transmitted from the GDI 131, and generates a control command for facsimile transmission. Reference numeral 135 denotes a UI module, and the UI module 135 supplies and controls a user interface for the FAX driver 150. Reference numeral 136 denotes a language monitor, and the language monitor 136, which serves as a data communication UF, controls data transmission/reception. Reference numeral 139 denotes a status monitor, and the status monitor 139 displays a result of facsimile transmission, and the status of the MFP 3 such as a warning status or an error status. Reference numeral 140 is an address book, and, with the address book 140, registration, change, and so forth of names, FAX numbers, and so forth of communication partners to which data is to be transmitted by facsimile can be managed together. Reference numeral 37 denotes a port monitor. The port monitor 37 performs a process of transmitting, to an appropriate port, data that is transmitted from the language monitor 136, and a process of receiving, via a class driver 38, data that is transmitted from the MFP 3. Reference numeral 38 denotes a class driver, and the class driver 38 is a low-level module that is closest to ports. In the first embodiment of the present invention, the class driver 38 corresponds to a printer class driver for the WSD or for the IHV-specific protocol. and controls ports (network ports in the first embodiment of the present invention). The FAX driver 150 is a FAX driver made by ABC Corporation that is a manufacturer of the MFP 3.

FIG. 17 is an illustration showing a PRINTER_INFO structure. For example, when the OS is Windows (registered trademark) Vista OS, a PRINTER_INFO_2 structure corresponds to the PRINTER_INFO structure shown in FIG. 17. Referring to FIG. 17, pPrinterName is a character string pointer indicating a printer name or a FAX name. Each of the printer name and the FAX name can be changed into any name by the user, and is also called a friendly name.

pPortName is a character string pointer indicating a virtual port name of a virtual port to which a printer or a FAX is connected. In a device having a printer function and a facsimile function, such as the MFP 3, a plurality of logical ports are provided for the individual functions, and a plurality of virtual ports that are assigned to the plurality of logical ports are generated in the PC 1. For example, a virtual port having a name "USB001" and a virtual port having a name "USB002" are assigned to the printer function and the facsimile function, respectively. pDriverName is a character string pointer indicating a printer driver name or a FAX driver name. For example, for the printer function of the MFP 3, pDriverName is a pointer of a driver name that has been registered in the OS when the printer driver 50 has been installed. The driver name is also set as a default value of the printer name. Furthermore, for example, for the facsimile function of the MFP 3, pDriverName is a pointer of a driver name that has been registered in the OS when the FAX driver 150 has been installed. The driver name is also set as a default value of the FAX name. Status is a value indicating a status of the device. A flag is assigned to each of statuses such as an error status and a status indicating an operation state, and the OR of the flags is set. For example, "0" is set for an online status.

Figure 5A:
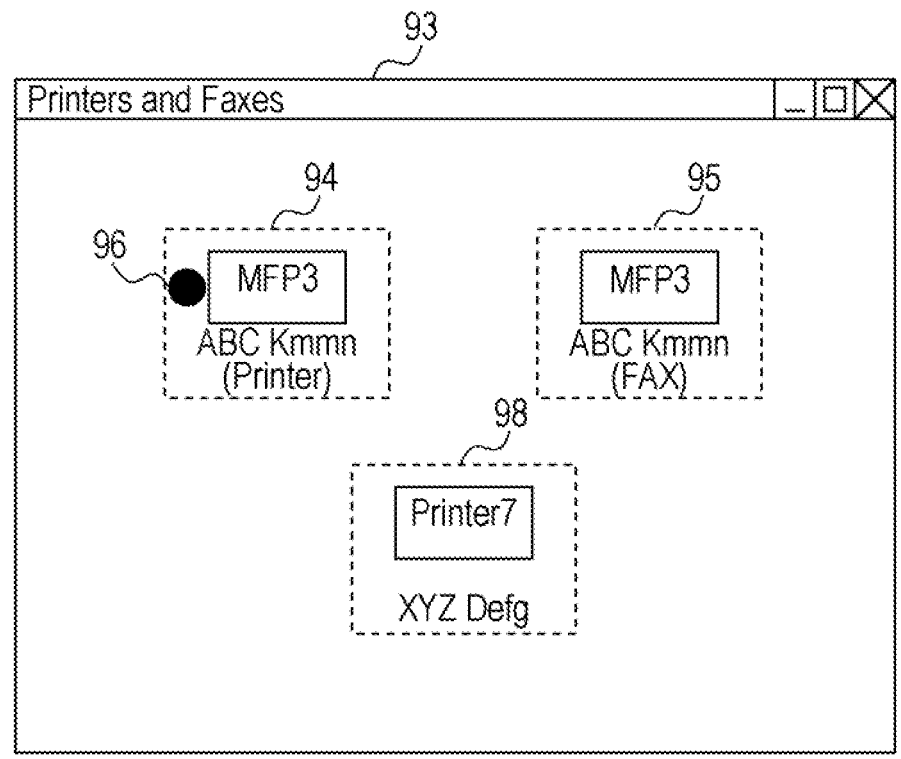
FIG. 5A is an illustration showing a printer and FAX folder.

FIG. 5A is an illustration showing a printer and FAX folder. In FIG. 5A, reference numeral 93 denotes a printer and FAX folder. The printer and FAX folder 93 is displayed on the PC 1, and printers and FAXs that are available on the PC 1 are displayed in the printer and FAX folder 93 on a driver-by-driver basis. In FIG. 5A, a state is illustrated, in which a printer (the printer driver 50) and a FAX (the FAX driver 150) of the MFP 3 are available. Reference numeral 94 denotes a printer icon for the MFP 3. In the printer icon 94, a printer name "ABC Kmmn (Printer)", with which a printer can be identified as the printer of the MFP 3, is displayed. The printer name is set in pPrinterName shown in FIG. 17. Additionally, "ABC Kmmn (Printer)" is also a driver name that has been registered in the OS when the printer driver 50 has been installed, and that is set is in pDriverName shown in FIG. 17. The driver name is set as the default value of the printer name. For example, when the OS is Windows (registered trademark) Vista OS, the driver name is described in a setup file that is called an information (INF) file. When the printer driver 50 is installed, the driver name is set in pDriverName shown in FIG. 17, and registered in the OS. Reference numeral 95 is a FAX icon for the MFP 3. In the FAX icon 95, a FAX name "ABC Kmmn (FAX)", with which a FAX can be identified as the FAX of the MFP 3, is displayed. The FAX name is set in pPrinterName shown in FIG. 17. Additionally, "ABC Kmmn (Printer)" is also a driver name that has been registered in the OS when the FAX driver 150 has been installed, and that is set is in pDriverName shown in FIG. 17. The driver name is set as the default value of the FAX name. For example, when the OS is Windows (registered trademark) Vista OS, the driver name is described in a setup file that is called an INF file. When the FAX driver 150 is installed, the driver name is set in pDriverName shown in FIG. 17, and registered in the OS. As described below with reference to FIG. 5B, the user can change each of the printer name and the FAX name into any name. Reference numeral 98 is a printer icon for the printer 7. Reference numeral 96 is a default device mark. The default device mark 96 indicates a default device that is set as a device for normal use from among the printers (printer drivers) and the FAXs (FAX drivers) which are shown in the printer and FAX folder 93. Note that the user can set, using a manual operation, any one of the printers (the printer drivers) or any one of the FAXs (the FAX drivers) in the printer and FAX folder 93 as the default device for normal use. In FIG. 5A, a state is illustrated, in which the printer icon 94 is set as the default device.

Figure 5B:
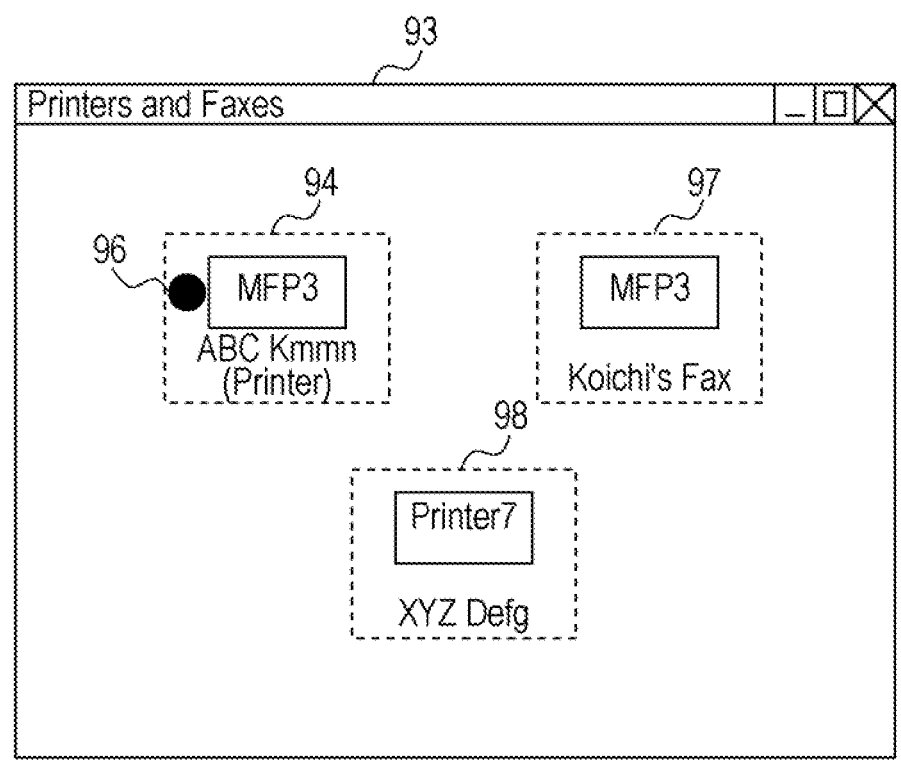
FIG. 5B is another illustration showing the printer and FAX folder.

FIG. 5B is another illustration showing the printer and FAX folder. In FIG. 5B, components identical to those in FIG. 5A are denoted by the same reference numerals, and a description thereof is omitted. Reference numeral 97 is a FAX icon for the MFP 3. In the FAX icon 97, a FAX name "Koichi's Fax", with which a FAX can be identified as the FAX of the MFP 3, is displayed. The FAX name is not a name that is set as a default value using a driver name which has been registered in the OS when the FAX driver 150 has been installed, and which is set in pDriverName shown in FIG. 17. The user has appropriately changed the value into a name, and has set the name as the FAX name. Because the user can change the printer name or the FAX name into any name in this manner, the printer name or the FAX name that is shown in the printer and FAX folder 93 is called a friendly name. For example, a friendly name of the printer represented by the printer icon 94 is "ABC Kmmn (Printer)", and a friendly name of the FAX represented by the FAX icon 97 is "Koichi's Fax".

FIGS. 18A to 18B are illustrations showing information that is set in PRINTER_INFO structures. FIGS. 18A and 18B illustrate a state of the printer icon 94 in the printer and FAX folder 93 shown in FIG. 5A and a state of the FAX icon 95 in the printer and FAX folder 93 shown in FIG. 5A, respectively.

Referring to FIG. 18A, information that is the printer name "ABC Kmmn (Printer)" is set in pPrinterName (as a friendly name). The information that is set has been obtained from the INF file when the printer driver 50 has been installed. The virtual port name "USB001" for the printer function of the MFP 3 is set in pPortName. Furthermore, information that is the driver name "ABC Kmmn (Printer)" of the printer driver 50 is set in pDriverName. The information that is set has been obtained from the INF file when the printer driver 50 has been installed. "0" indicating an online status is set in Status.

Referring to FIG. 18B, information that is the FAX name "ABC Kmmn.(FAX)" is set in pPrinterName. The information that is set has been obtained from the INF file when the FAX driver 150 has been installed. The virtual port name "USB002" for the facsimile function of the MFP 3 is set in pPortName. Furthermore, information that is the driver name "ABC Kmmn (FAX)" of the FAX driver 150 is set in pDriverName. The information that is set has been obtained from the INF file when the FAX driver 150 has been installed. "0" indicating an online status is set in Status.

FIGS. 18C to 18D are illustrations showing information that is set in PRINTER_INFO structures. FIGS. 18C and 18D illustrate a state of the printer icon 94 in the printer and FAX folder 93 shown in FIG. 5B and a state of the FAX icon 97 in the printer and FAX folder 93 shown in FIG. 5B, respectively.

Referring to FIG. 18C, information that is the printer name "ABC Kmmn (Printer)" is set in pPrinterName. The information that is set has been obtained from the INF file when the printer driver 50 has been installed. The virtual port name "USB001" of for the printer function of the MFP 3 is set in pPortName. Furthermore, information that is the driver name "ABC Kmmn (Printer)" of the printer driver 50 and "0" indicating an online status are set in pDriverName and Status, respectively.

Referring to FIG. 18D, information that is the FAX name "Koichi's Fax" is set in pPrinterName. The information that is set is a friendly name, and the value that was set in pPrinterName illustrated in FIG. 18B has been changed into the friendly name by the user in the printer and FAX folder 93. The virtual port name "USB002" of a virtual port for the facsimile function of the MFP 3 is set in pPortName. Furthermore, the driver name "ABC Kmmn (FAX)" of the FAX driver 150 and "0" indicating an online status are set in pDriverName and Status, respectively.

Figure 6A:
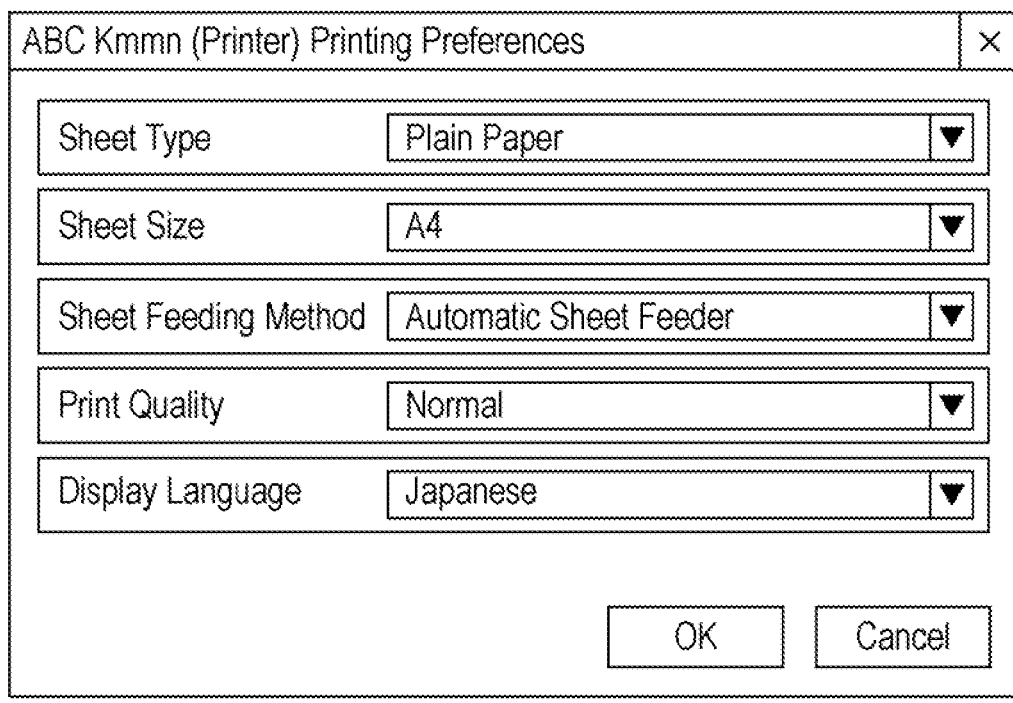
FIG. 6A is an illustration of a print setting dialog for the printer driver 50.

FIG. 6A is an illustration of a print setting dialog for the printer driver 50. In FIG. 6A, reference numeral 104 denotes a print setting dialog. By selecting each of operation parts on the print setting dialog 104, a corresponding one of settings necessary for printing with the MFP 3 can be set.

Figure 6B:
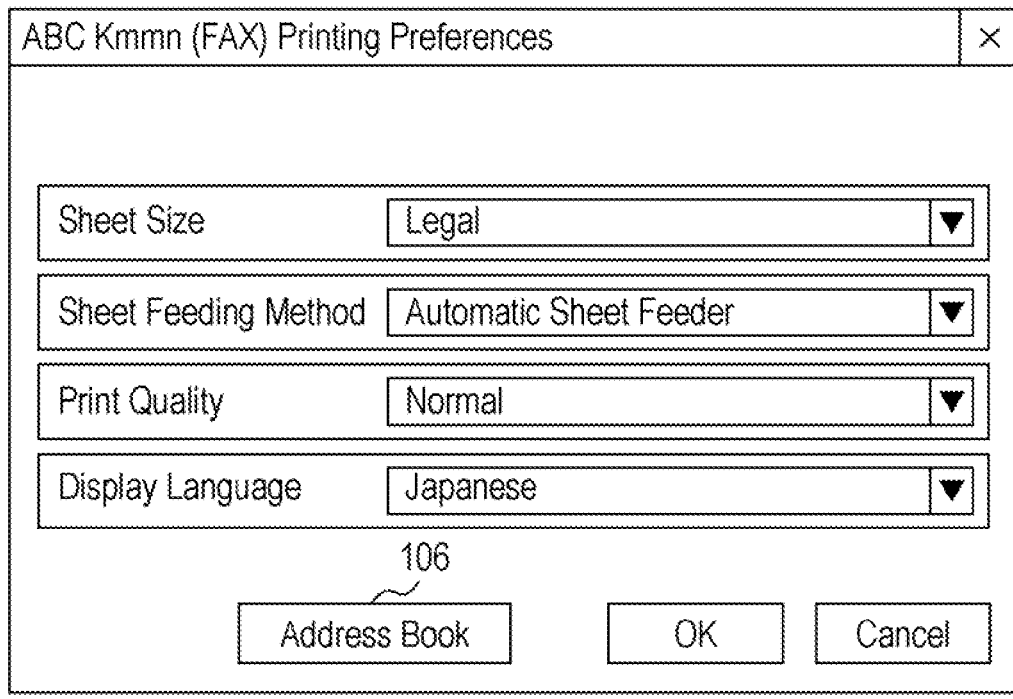
FIG. 6B is an illustration of a print setting dialog for a FAX driver 150.

FIG. 6B is an illustration of a print setting dialog for the FAX driver 150. Because a FAX driver corresponds to a printer class driver as shown in FIG. 14, generally, a user interface for setting for facsimile transmission is called a print setting dialog. In FIG. 6B, reference numeral 105 is a print setting dialog. By selecting each of operation parts on the print setting dialog 105, a corresponding one of settings necessary for facsimile transmission with the MFP 3 can be set. Reference numeral 106 denotes an address book, and, with the address book 106, information concerning communication partners to which data is to be transmitted by facsimile can be registered and managed.

FIG. 15A is an illustration of a printer queue folder. In FIG. 15A, reference numeral 107 denotes a printer queue folder. In the printer queue folder 107, print jobs to be processed by the printer driver 50 are displayed. With the printer queue folder 107, operations, such as an operation of halting a print job, an operation of restarting a print job, and an operation of canceling a print job, can be performed.

FIG. 15B is an illustration of a printer queue folder. In FIG. 15B, reference numeral 108 denotes a printer queue folder. In the printer queue folder 108, print jobs (facsimile transmission jobs) to be processed by the FAX driver 150 are displayed. With the printer queue folder 108, operations, an operation of halting a print job, an operation of restarting a print job, and an operation of canceling a print job, can be performed.

Figure 7A:
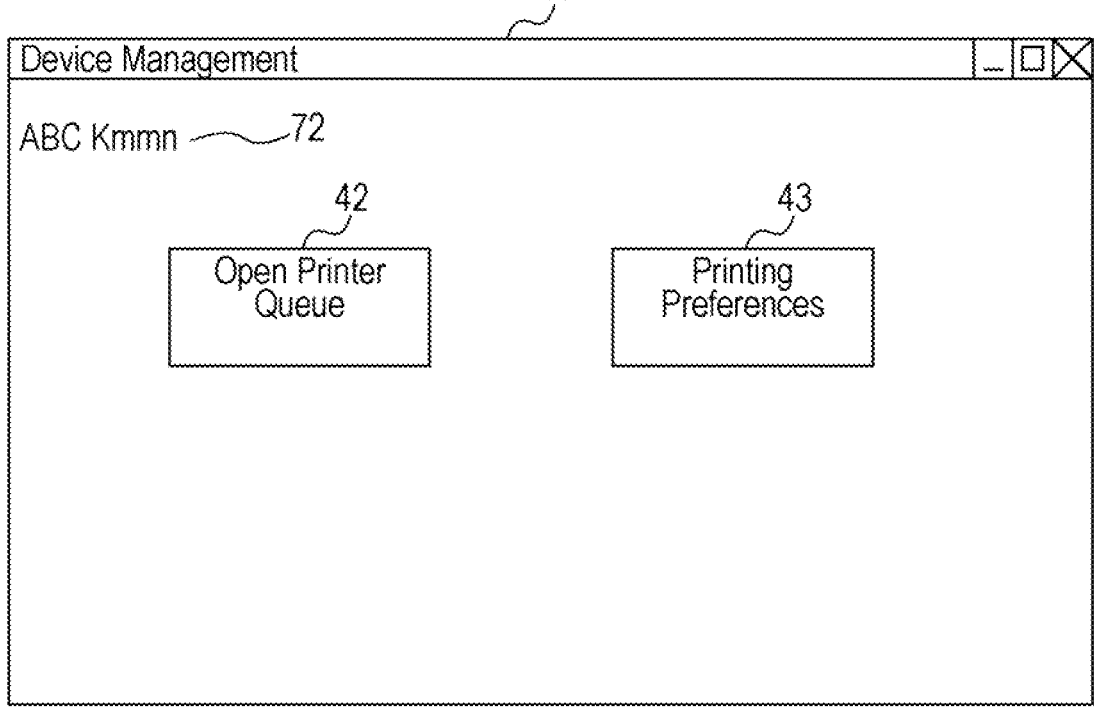
FIG. 7A is an illustration of a device management application.
Figure 19A:
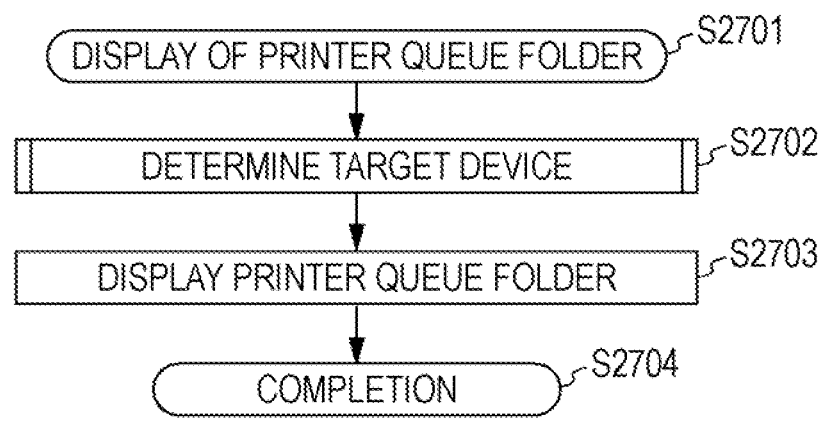
FIG. 19A is a flowchart of a process of displaying a printer queue folder.
Figure 19B:
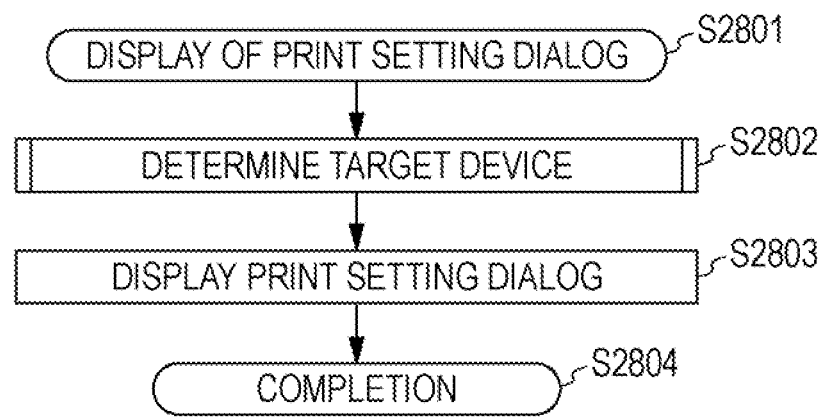
FIG. 19B is a flowchart of a process of displaying a print setting dialog.

FIG. 7A is an illustration of a device management application. In FIG. 7A, reference numeral 80 denotes a device management application. With the device management application 80, management of the MFP 3 can be performed. Reference numeral 72 denotes a device name display part. In an example of FIG. 7A, a default name that is set in a <dm:defaultName> element shown in FIG. 8 is displayed in the device name display part 72. Reference numeral 42 is a printer queue button. When the printer queue button 42 is pressed, a process of displaying a printer queue folder, which is illustrated in FIG. 19A, is performed, whereby either the printer queue folder 107 shown in FIG. 15A or the printer queue folder 108 shown in FIG. 15B is displayed. Which printer queue folder, the printer queue folder 107 or the printer queue folder 108, is to be displayed is determined using a process illustrated in FIG. 16. Reference numeral 43 denotes a print setting button. When the print setting button 43 is pressed, a process of displaying a print setting dialog, which is illustrated in FIG. 19B, is performed, whereby the print setting dialog 104 with which individual settings necessary for printing with the MFP 3 can be set, and which is shown in FIG. 6A is displayed. Alternatively, the print setting dialog 105 with which individual settings necessary for facsimile transmission with the MFP 3 can be set, and which is shown in FIG. 6B is displayed. Which print setting dialog, the print setting dialog 104 or the print setting dialog 105, is to be displayed is determined using the process illustrated in FIG. 16.

Figure 7B:
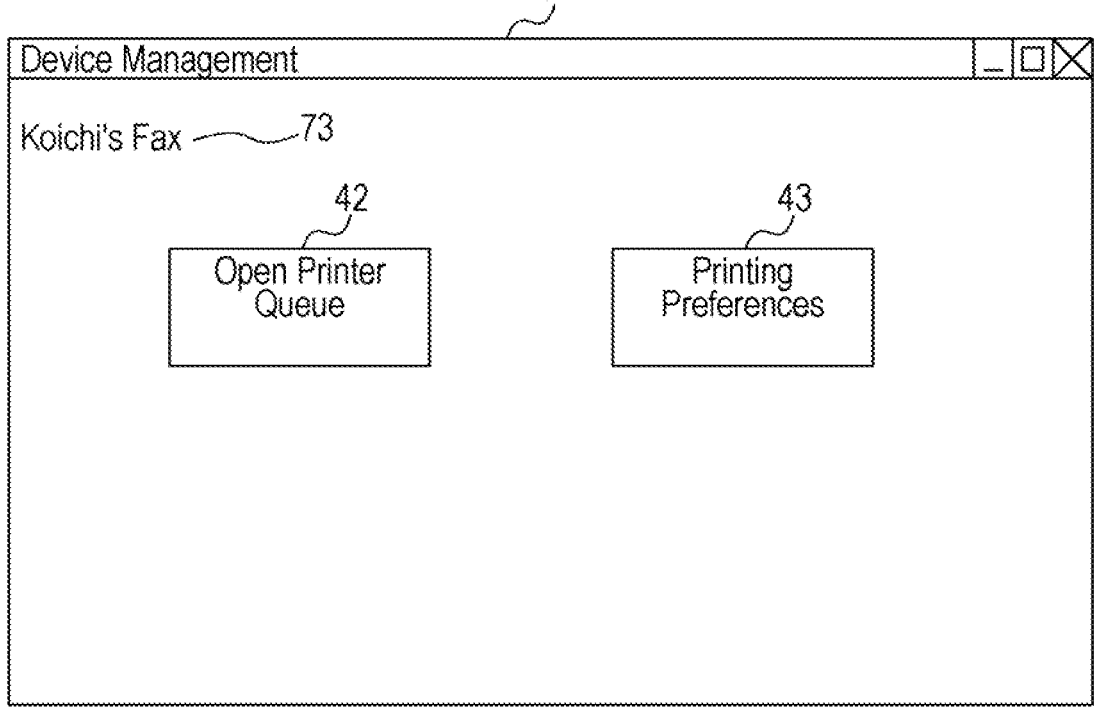
FIG. 7B is another illustration of the device management application.

Note that, referring to FIGS. 7A and 7B, an example in which a printer queue folder is opened and displayed and an example in which a print setting dialog is opened and displayed are described as examples of individual functions (programs) that can be performed using the device management application 80 and that are associated with devices. However, the present invention is not limited to the above-described examples. The present invention can be applied to similar functions and programs.

For example, for an application for opening and displaying a picture or document, and for printing the picture or document, when printing is performed, a printer selection screen for selecting a printer is displayed. The present invention can be applied to a function (program) of setting a printer that is first selected on the printer selection screen as a target device that is determined using the process illustrated in FIG. 16, and of displaying the target device on the printer selection screen. With the function (program), operability for users can be markedly improved.

Figure 16:
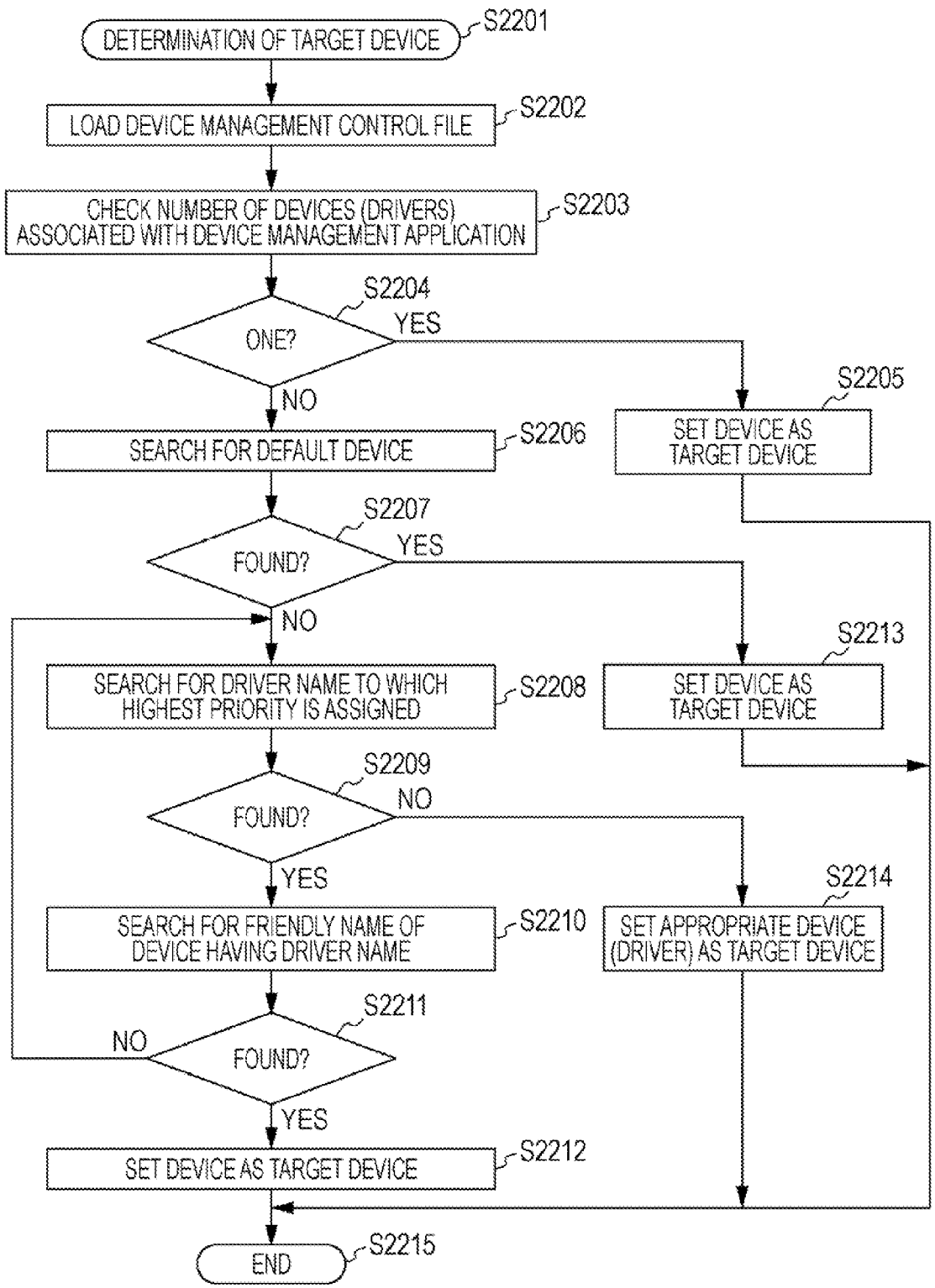
FIG. 16 is a flowchart of a process of determining a target device.

Furthermore, for example, in a case in which a function (program) of providing a link to a website that is associated to a device is implemented as a function (program) that can be performed using the device management application 80, it is necessary that information concerning the device be added as a parameter to the URL of the website. Here, a target device that is determined using the process illustrated in FIG. 16 is set as the specified parameter, and a link to a website that is associated with the target device is provided, whereby the operability for users can be markedly improved.

FIG. 7B is another illustration showing the device management application. In FIG. 7B, components identical to those in FIG. 7A are denoted by the same reference numerals, and a description thereof is omitted. The user has appropriately changed, into a friendly name, a name that is set as a default value, and the friendly name is set as a FAX name shown in the FAX icon 97 illustrated in FIG. 5B. Reference numeral 73 denotes a device name display part, and, in an example shown in FIG. 7B, the friendly name is displayed in the device name display part 73.

FIG. 8 is an illustration showing the contents of a device management control file. Information shown in FIG. 8 is stored in a deice management control file 11 or a device management control file 12. Referring to FIG. 8, the name of ABC Corporation that is a manufacturer of the device (the MFP 3) is set in a <dm:manufacturer> element. The model name of the device (the MFP 3), "Kmmn", is set in a <dm:model> element. Information necessary to control a device name that is to be set in the device name display part 72 is set in a <dm:deviceNameControl> element. A default name that is to be set in the device name display part 72 is set in a <dm:defaultName> element. In a first <dm:priorityOrder> element, information concerning the printer driver 50 and a priority of the printer driver 50 are defined. In the first <dm:priorityOrder> element, a driver name of the printer driver 50 is set in a <dm:driverName> element. One (a highest priority) is set as a priority in a <dm:order> element. In a second <dm:priorityOrder> element, information concerning the FAX driver 150 and a priority of the FAX driver 150 are defined. In the second <dm:priorityOrder> element, a driver name of the FAX driver 150 is set in a <dm:driverName> element. Two (a second priority) is set as a priority in a <dm:order> element.

The printer queue button 42 and the print setting button 43 that are shown in FIGS. 7A and 7B are displayed on the device management application 80 that is activated when the MFP 3 is connected to the PC 1. As shown in FIGS. 7A and 7B, two <dm:function> elements, each of which represents a corresponding one of the printer queue button 42 and the print setting button 43 and a function thereof, are set in a <dm:functions> element.

First, the first <dm:function> element will be described. A character string "Open Printer Queue", which is to be displayed on the printer queue button 42, is set in a <dm:name xml:lang="en-US">OpenPrinterQueue</dm:name> element. A code "open-PrinterQueue", which indicates a function (program) of displaying the printer queue folder 107 or 108, is set in a <dm:execute>openPrinterQueue</dm:execute> element. The process of displaying a printer queue folder, which is illustrated in FIG. 19A, is associated with the code "openPrinterQueue".

Next, the second <dm:function> element will be described. A character string "Printing Preferences", which is to be displayed on the print setting button 43, is set in a <dm:name xml:lang="en-US">Printing Preferences</dm:name> element. A code "printinereferences", which indicates a function (program) of displaying the print setting dialog 104 or 105, is set in a <dm:execute>printing Preferences</dm:execute> element. The process of displaying a print setting dialog, which is illustrated in FIG. 19B, is associated with the code "printingPreferences".

Figure 9:
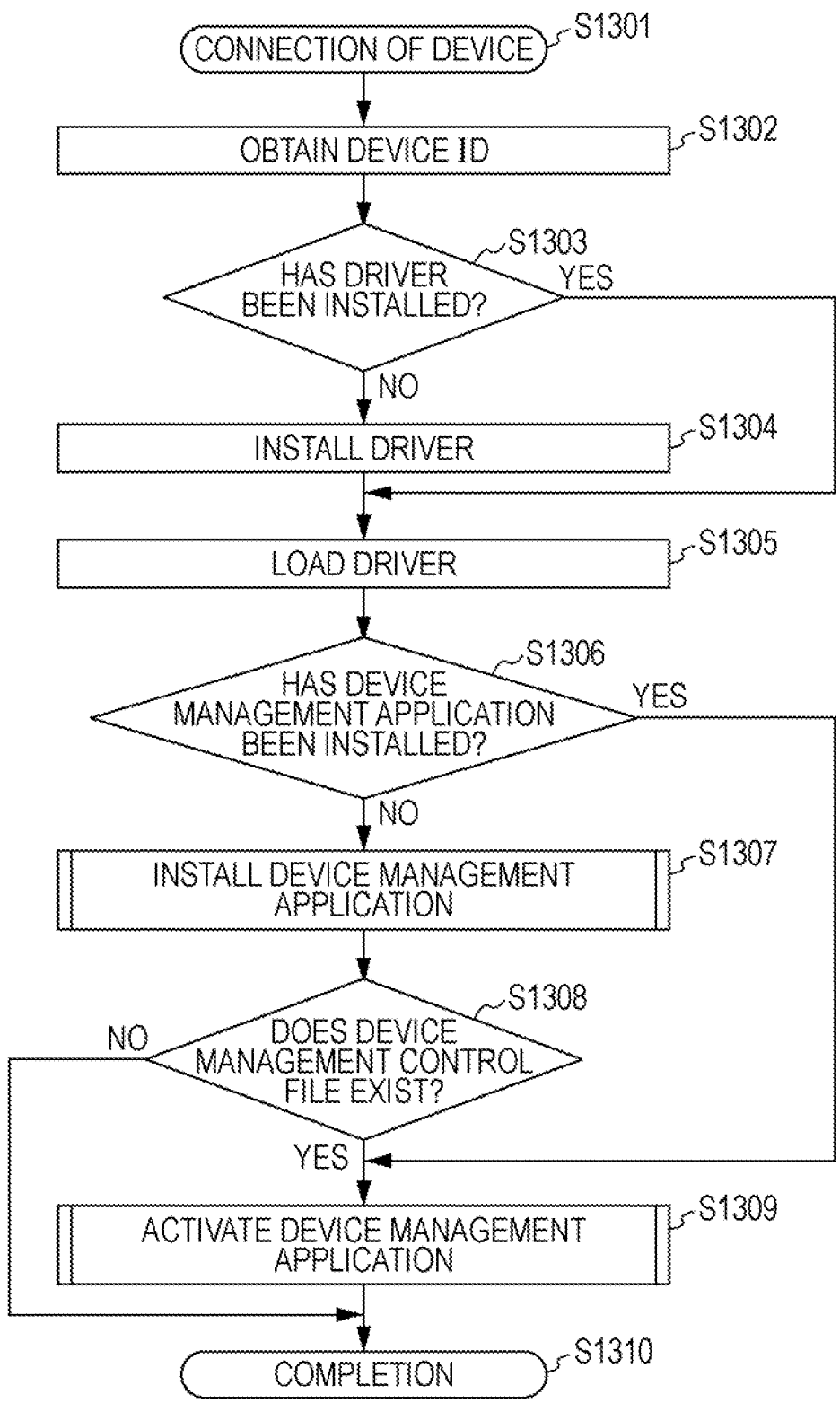
FIG. 9 is a flowchart of a process in case of connection of a device.

"MFG:ABC:MDL:Kmmn:CLS:PRINTER;CMD:K4; DES:ABC Kmmn;" indicates a device identification (ID). The device ID is a device ID of a printer function of the MFP 3, and the PC 1 can obtain the device ID from the MFP 3 via the network 4. The device ID indicates the following information:

Manufacturer (MFG:): ABC
Model (MDL:): Kmmn
Class (CLS:): PRINTER
Command (CMD:): K4 (a print control command that is a private command of ABC Corporation)
Description (DES:): ABC Kmmn FIG. 9 is a flowchart of a process in a case of connection of a device. A program based on a flow illustrated in FIG. 9 is stored on the HDD 1202, loaded into the RAM 1201, and executed by the CPU 1204.

Referring to FIG. 9, when a device (the MFP 3) is connected to a PC (the PC 1) via the network 4 (step S1301), a device ID is obtained (step S1302). Next, whether or not a driver (the printer driver 50 and the FAX driver 150) has been installed is determined (step S1303). When it is determined in step S1303 that no driver has been installed, a driver (the printer driver 50 and the FAX driver 150) is installed (step S1304).

Figure 10:
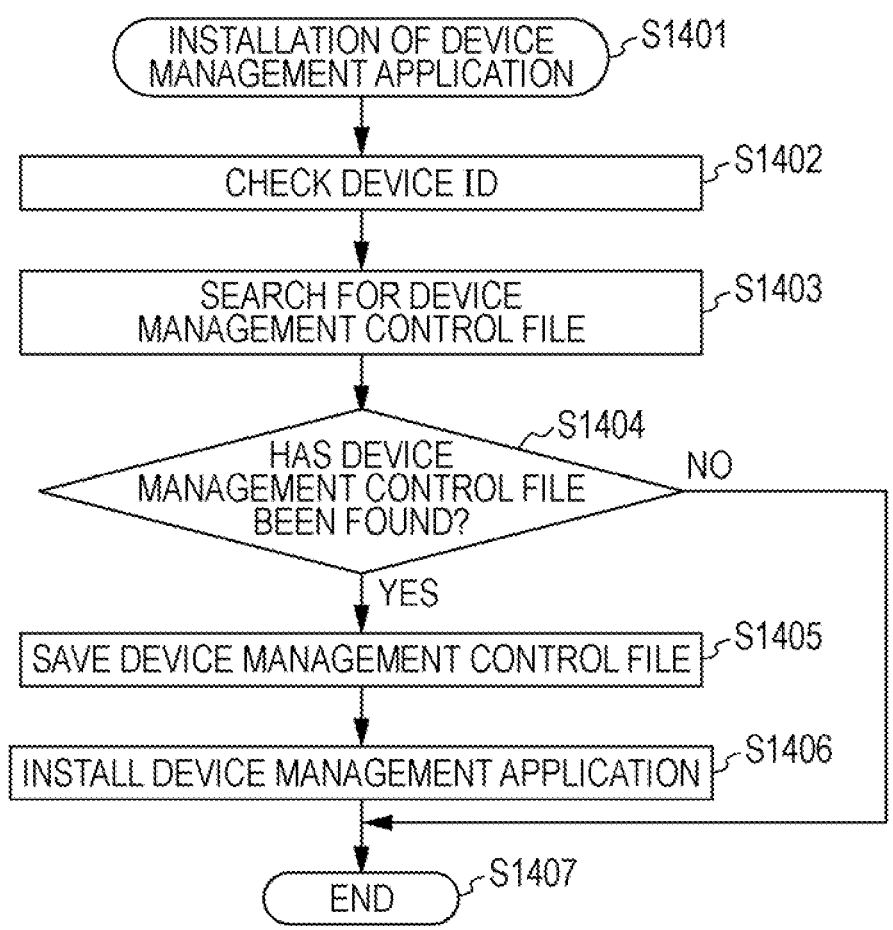
FIG. 10 is a flowchart of a process of installing a device management application.
Figure 11:
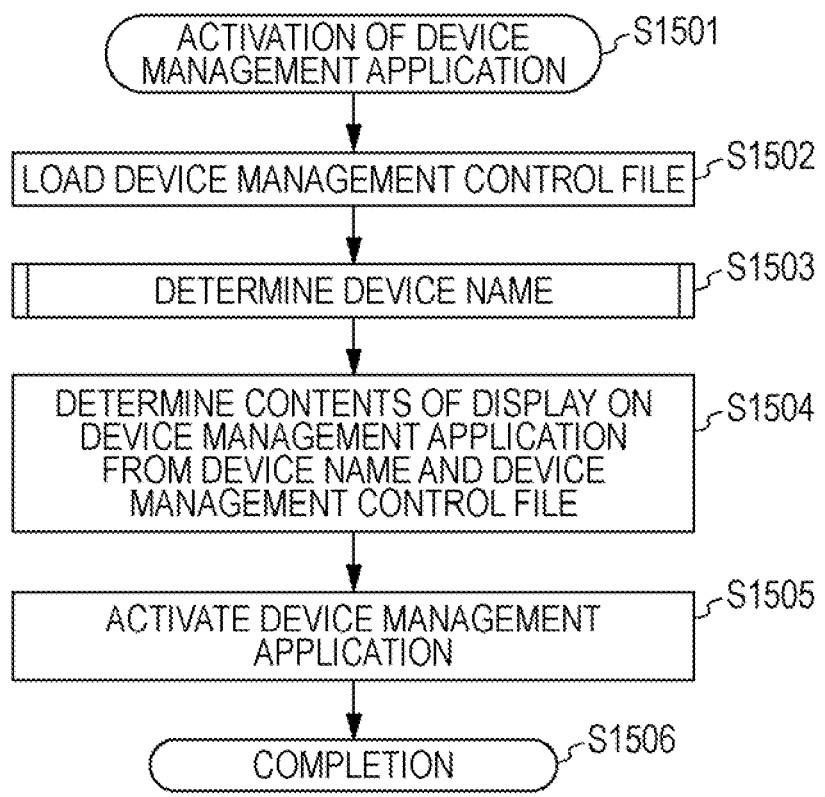
FIG. 11 is a flowchart of a process of activating a device management application.

After that, the driver (the printer driver 50 and the FAX driver 150) is loaded (step S1305). Then, whether or not a device management application (the device management application 80) has been installed is determined (step S1306). When it is determined in step S1306 that no device management application has been installed, a process of installing a device management application, which is described below with reference to FIG. 10, is performed (step S1307). Whether or not a device management control file (shown in FIG. 8) exists is determined (step S1308). When it is determined in step S1308 that a device management control file exists, a process of activating a device management application, which is described below with reference to FIG. 11, is performed (step S1309). The process in a case of connection of a device is completed (step S1310). When it is determined in step S1308 that no device management control file (shown in FIG. 8) exists, the process proceeds to step S1310, and the process in a case of connection of a device is completed. When it is determined in step S1306 that a device management application (the device management application 80) has already been installed, the process proceeds to step S1309. When it is determined in step S1303 that a driver (the printer driver 50 and the FAX driver 150) has already been installed, the process proceeds to step S1305.

FIG. 10 is a flowchart of the process of installing a device management application. A program based on a flow illustrated in FIG. 10 is stored on the HDD 1202, loaded into the RAM 1201, and executed by the CPU 1204.

In step S1307 shown in FIG. 9, when the process of installing a device management application is performed, referring to FIG. 10, the process of installing a device management application starts (step S1401).

A deice ID of the device (the MFP 3) that is connected via the network 4 is checked (step S1402).

In accordance with manufacturer (MFG:) information and model (MDL:) information included in the device ID, search for the device management control file 11 or the device management control file 12 among device management control tiles that are provided on the web server 9 or that are stored on the CD-ROM 10 which is inserted in the PC 1 is performed (S1403). When the deice management control file 11 or the device management control file 12 has been found (step S1404), the found deice management control file is saved on the HDD 1202 of the PC 1 (step S1405), and a device management application is installed (step S1406). When installation of a device management application is completed, the process of installing a device management application is terminated (step S1407). When the deice management control file 11 or the device management control file 12 has not been found in step S1404, the process of installing a device management application is terminated without installation of any device management application (S1407).

FIG. 11 is a flowchart of the process of activating a device management application. A program based on a flow illustrated in FIG. 11 is stored on the HDD 1202, loaded into the RAM 1201, and executed by the CPU 1204.

Figure 12:
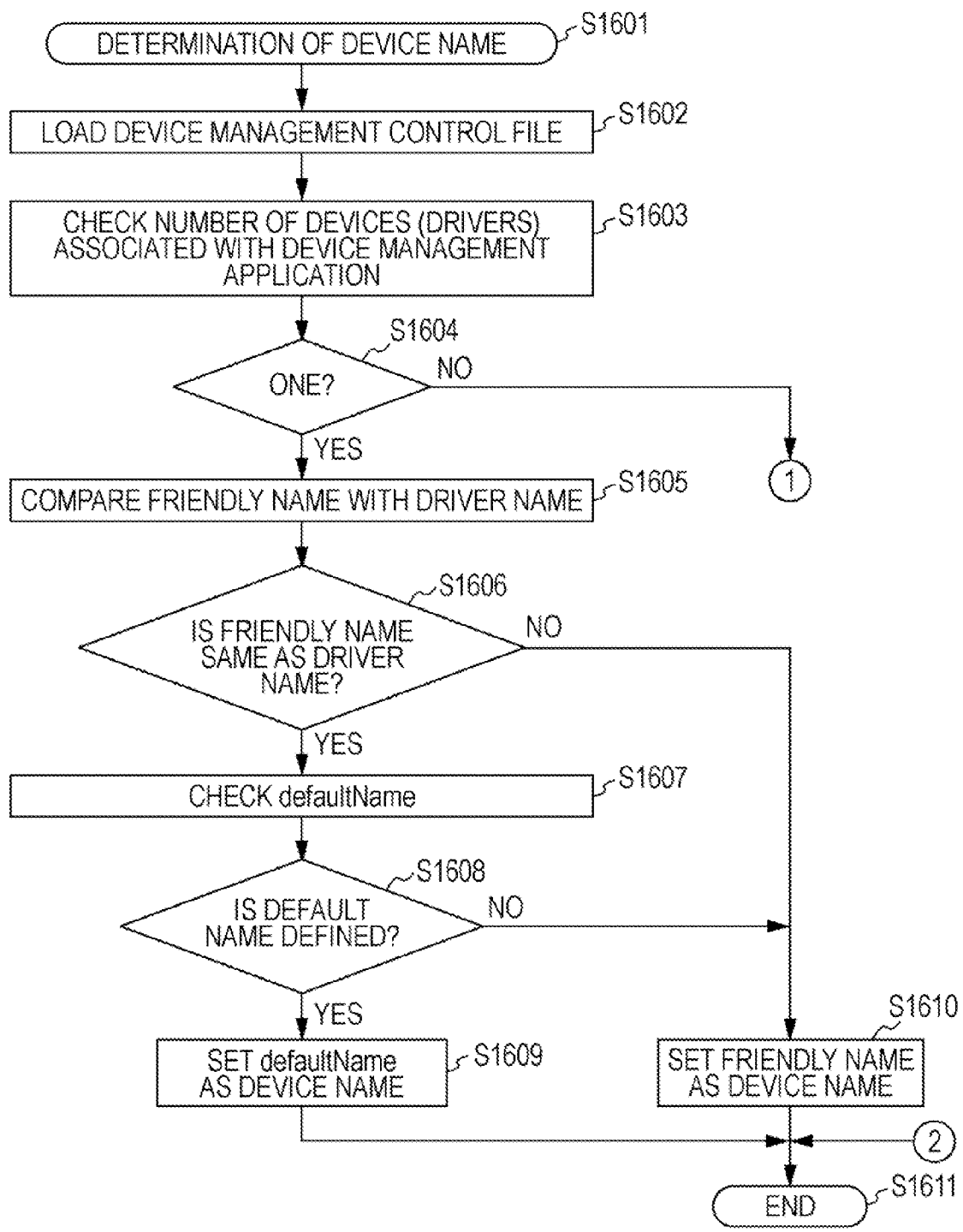
FIG. 12 is a first portion of a flowchart of a process of determining a device name.

In step S1309 shown in FIG. 9, when the process of activating a device management application is performed, referring to FIG. 11, the process of activating a device management application starts (step S1501). The device management control file that was saved in step S1405 shown in FIG. 10 is loaded (step S1502). A process of determining a device name, which is described below with reference to FIG. 12, is performed, thereby determining a device name that is to be displayed in the device name display part 72 or 73 (step S1503). The contents of display on the device management application are determined from the device name and the device management control file (step S1504). The device management application 80 is activated (step S1505), and the process of activating a device management application is completed (step S1506).

Figure 13:
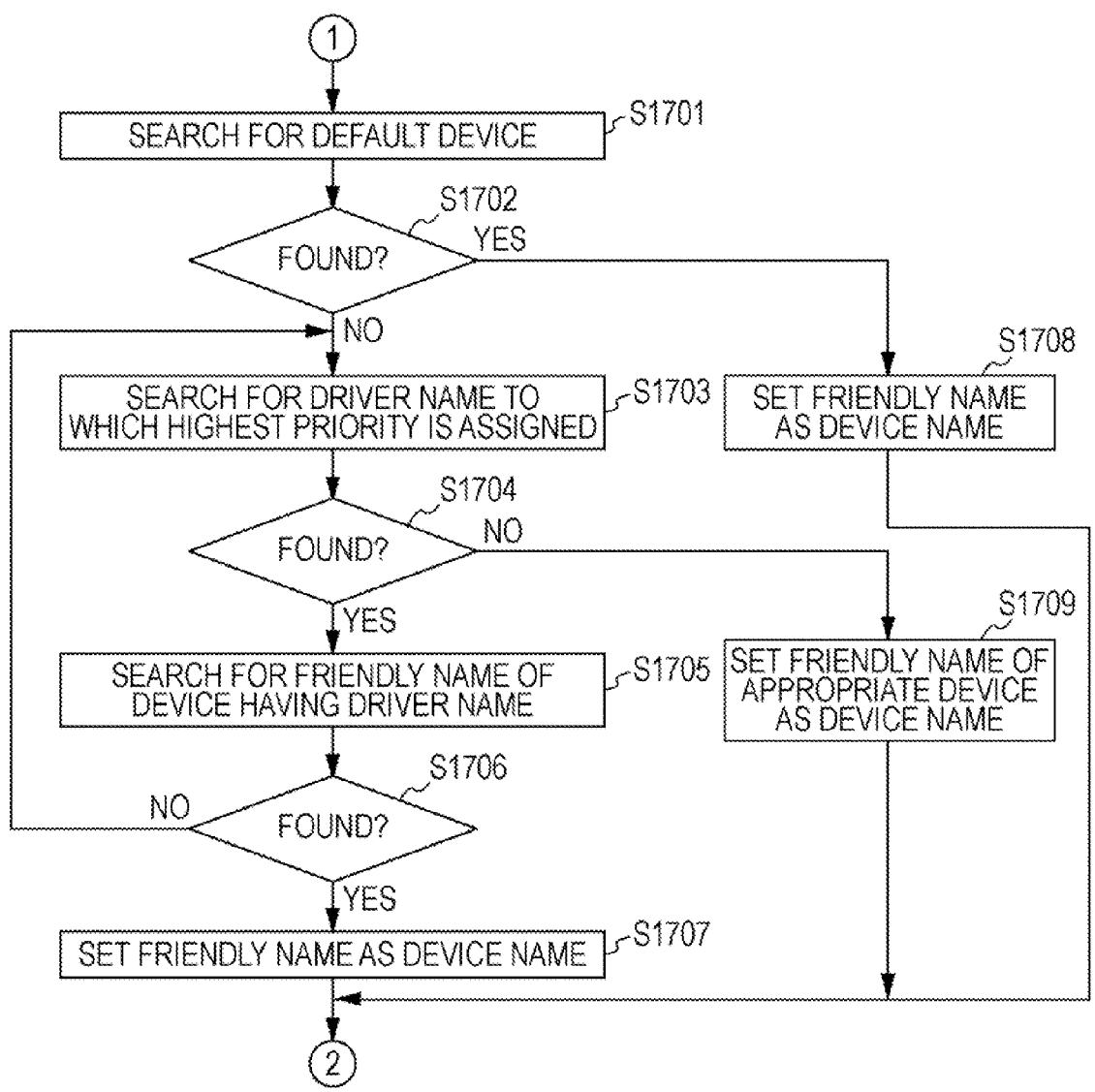
FIG. 13 is a second portion of the flowchart of the process of determining a device name.

FIGS. 12 and 13 are portions of a flowchart of the process of determining a device name. A program based on a flow illustrated in FIGS. 12 and 13 is stored on the HDD 1202, loaded into the RAM 1201, and executed by the CPU 1204.

In step S1503 shown in FIG. 11, when the process of determining a device name is performed, referring to FIG. 12, the process of determining a device name starts (step S1601). The device management control file that was saved in step S1405 shown in FIG. 10 is loaded (step S1602), and the number of devices (drivers) that are associated with the device management application 80 is checked (step S1603). When the number of devices (drivers) is one (step S1604), the friendly name (that is set in pPrinterName shown in any one of FIGS. 18A to 18D) of the one checked device (driver) is compared with the driver name of the device (driver) (that is set in pDriverName shown in a corresponding one of FIGS. 18A to 18D) (step S1605).

Whether or not the friendly name of the one checked device (driver) is the same as the driver name of the device (driver) is determined (step S1606). When it is determined in step S1606 that friendly name of the one checked device (driver) is the same as the driver name of the device (driver), the <dm:defaultName> element of the one checked device (driver) is checked (step S1607). Whether or not a default name ("ABC Kmmn" in the example shown in FIG. 8) is defined in the <dm:defaultName>ABC Kmmn</dm:defaultName> element as shown in FIG. 8 is determined (step S1608). When it is determined in step S1608 that a default name is defined, the default name that is defined in the <dm:defaultName> element of the one checked device (driver) is set as a device name (S1609). Then, the process of determining a device name is terminated (step S1611).

In this manner, when the number of devices (drivers) is one and the friendly name of the device (driver) is the same as the driver name of the device (driver), a default name that is defined in the <dm:defaultName> element is displayed as a device name as shown in the device name display part 72 illustrated in FIG. 7A. Accordingly, optimum information is displayed for users, whereby the operability for the users can be improved.

When it is determined in step S1608 that no default name is defined, the friendly name of the one checked device (driver) is set as a device name (step S1610). The process proceeds to step S1611, and the process of determining a device name is terminated. Note that, when a result of determination in step S1604 is YES, alternatively, the processes of steps S1605 to S1609 can be omitted, and the process of step S1610 can be performed.

When it is determined in step S1606 that the friendly name of the device (driver) is not the same as the driver name of the device (driver), the process proceeds to step S1610.

For example, when a plurality of MFPs whose models are the same exist on the network 4, a plurality of printer icons and a plurality of FAX icons are displayed in the printer and FAX folder 93 as follows.

ABC Kmmn (Printer)
ABC Kmmn (Printer) (Copy 1)
ABC Kmmn (FAX)
ABC Kmmn (FAX) (Copy 1)

In such a case, if display of a default name, which is defined in a <dm:defaultName>element, as a device name in a device name display part of a device management application is performed, a plurality of device management applications for physically different devices are displayed. Because the same device name (default name) is displayed in a device name display part of each of the device management applications, it is difficult to determine which device management application is displayed for which MFP. There is a high probability of improper operation being performed by the user, and this is a problem. In the first embodiment of the present invention, this problem is solved using a process that is described below. When it is determined in step S1604 that the number of devices (drivers) which are associated with the device management application 80 is two or more, the process proceeds to step S1701 shown in FIG. 13. Then, search for the default device among the devices (drivers) that are associated with the device management application 80 is performed (step S1701). Whether or not the default device has been found among the devices (drivers) that are associated with the device management application 80 is determined (step S1702). When it is determined that the default device has been found, the friendly name of the device (driver) is set as a device name (step S1708). Then, the process proceeds to step S1611 shown in FIG. 12, and the process of determining a device name is terminated. Here, it is supposed that the default device mark is added to the FAX (the FAX driver) represented by the FAX icon 97, and that the FAX is set as the default device for normal use. In this case, the friendly name of the default device for normal use is displayed in the device name display part 73 shown in FIG. 7B. Accordingly, the default device for normal use is preferentially used, and the friendly name of the default device is displayed as a device name in the device name display part 73 of the device management application 80, whereby the operability for users can be improved.

When it is determine in step S1702 that no default device has been found among the devices (drivers) that are associated with the device management application 80, the process proceeds to step S1703.

For example, a case in which the printer icon 98 (a driver made by another company) is set as the default device also corresponds to the above-mentioned case. In this case, the <dm:driverName> elements and the <dm:order> elements that are provided in the <dm:priorityOrder> elements shown in FIG. 8 are checked. Then, among the devices (drivers) that are associated with the device management application 80, search for a driver name to which a highest priority is assigned is performed (step S1703). When a driver name to which a highest priority is assigned has been found (step S1704), search for a friendly name of a device (driver) having the driver name to which a highest priority is assigned is performed among the devices (drivers) that are associated with the device management application 80 (step S1705).

Whether or not, among the devices (drivers) that are associated with the device management application 80, a friendly name of a device (driver) having the driver name to which a highest priority is assigned has been found is determined (step S1706). When it is determined that a friendly name of a device (driver) having the driver name to which a highest priority is assigned has been found, the friendly name is set as a device name (step S1707). Then, the process proceeds to step S1611 shown in FIG. 12, and the process of determining a device name is terminated.

When it is determined in step S1706 that, among the devices (drivers) that are associated with the device management application 80, no friendly name of a device (driver) having the driver name to which a highest priority is assigned has been found, the process returns to step S1703. Then, search for a driver name to which the next highest priority is assigned is performed.

When it is determined in step S1704 that no driver name to which the next highest priority is assigned has been found, an appropriate device (driver) is selected from among the devices (drivers) that are associated with the device management application 80. Then, the friendly name of the device (driver) is set as a device name (step S1709). After that, the process proceeds to step S1611 shown in FIG. 12, and the process of determining a device name is terminated. In this manner, the friendly name of a device (driver) to which a highest priority is assigned is displayed as a device name in the device name display part of the device management application, whereby the operability for users can be improved. Note that, when a result of determination in step S1702 is NO, alternatively, the processes of steps S1703 to S1707 can be omitted. and the process of step S1709 can be performed.

FIG. 16 is a flowchart of the process of determining a target device. A program based on a flow illustrated in FIG. 16 is stored on the HDD 1202, loaded into the RAM 1201, and executed by the CPU 1204.

When the printer queue button 42 or the print setting button 43, which are shown in FIG. 7A, is pressed, the process of determining a target device starts (step S2201). The deice management control file that was saved in step S1405 shown in FIG. 10 is loaded (step S2202), and the number of devices (drivers) that are associated with the device management application 80 is checked (step S2203). When the number of devices (drivers) is one (step S2204), the device (driver) is set as a target device (step S2205). and the process of determining a target device is terminated (step S2215). When it is determined in step S2204 that the number of devices (drives) that are associated with the device management application 80 is two or more, search for the default device among the devices (drivers) that are associated with the device management application 80 is performed (step S2206).

Whether or not the default device has been found among the devices (drivers) that are associated with the device management application 80 is determined (step S2207). When it is determined that the default device has been found, the default device (driver) is set as a target device (step S2213). Then, the process proceeds to step S2215, and the process of determining a target device is terminated. Here, it is supposed that the default device mark is added to the FAX (the FAX driver) represented by the FAX icon 95, and that the FAX is set as the default device for normal use. In this case, when the printer queue button 42 is pressed, the printer queue folder 108, which is shown in FIG. 15b, for the FAX (FAX driver) that is set as the default device for normal use is displayed. Furthermore, in this case, when the print setting button 43 is pressed, the print setting dialog 105, which is shown in FIG. 6B, for the FAX (FAX driver) that is set as the default device for normal use is displayed. In this manner, the default device for normal use is preferentially used, whereby the operability for users can be improved.

In step S2207, regarding a case in which no default device has been found among the devices (drivers) that are associated with the device management application 80, a case in which the printer icon 98 (a driver made by another company) is set as the default device also corresponds to the case. In this case, the <dm:driverName> elements and the <dm:order> elements that are provided in the <dm:priorityOrder> elements shown in FIG. 8 are checked. Then, among the devices (drivers) that are associated with the device management application 80, search for a driver name to which a highest priority is assigned is performed (step S2208). When a driver name to which a highest priority is assigned has been found (step S2209), search for a friendly name of a device (driver) having the driver name to which a highest priority is assigned is performed among the devices (drivers) that are associated with the device management application 80 (step S2210).

Whether or not, among the devices (drivers) that are associated with the device management application 80, a friendly name of a device (driver) having the driver name to which a highest priority is assigned has been found is determined (step S2211). When it is determined that a friendly name of a device (driver) having the driver name to which a highest priority is assigned has been found, the device (driver) having the friendly name is set as a target device (step S2212). Then, the process proceeds to step S2215, and the process of determining a target device is terminated. When it is determined in step S2211 that, among the devices (drivers) that are associated with the device management application 80, no friendly name of a device (driver) having the driver name to which a highest priority is assigned has been found, the process returns to step S2208, and search for a driver name to which the next highest priority is assigned is performed.

When it is determined in step S2209 that no driver name to which the next highest priority is assigned has been found, an appropriate device (driver) that is selected from among the devices (drivers) which are associated with the device management application 80 is set as a target device (step S2214). Then, the process proceeds to step S2215, and the process of determining a target device is terminated.

In this manner, a device (driver) to which a highest priority is assigned is set as a target device. Then, when the printer queue button 42 is pressed, the printer queue folder for the device (driver) is displayed. When the print setting button 43 is pressed, the print setting dialog for the device (driver) is displayed. Thus, the operability for users can be improved.

Note that, as information that is used to set a device as a target device, for example, a friendly name can be utilized. However, the present invention is not limited to the above-described example using a friendly name. Any information with which a device can be identified can be utilized.

FIG. 19A is a flowchart of the process of displaying a printer queue folder. A program based on a flow illustrated in FIG. 19A is stored on the HDD 1202, loaded into the RAM 1201, and executed by the CPU 1204. When the printer queue button 42 is pressed on the device management application 80, referring to FIG. 19A, the process of displaying a printer queue folder starts (step S2701). The process of determining a target device, which is illustrated in FIG. 16, is performed (step S2702). A printer queue folder that is assigned as a printer queue folder for the target device which has been set is opened and displayed (step S2703). The process of displaying a printer queue folder is completed (step S2704).

FIG. 19B is a flowchart of the process of displaying a print setting dialog. A program based on a flow illustrated in FIG. 19B is stored on the HDD 1202, loaded into the RAM 1201, and executed by the CPU 1204. When the print setting button 43 is pressed on the device management application 80, referring to FIG. 19B, the process of displaying a print setting dialog starts (step S2801). The process of determining a target device, which is illustrated in FIG. 16, is performed (step S2802). A print setting dialog that is assigned as a print setting dialog for the target device which has been set is opened and displayed (step S2803). The process of displaying a print setting dialog is completed (step S2804).

Second Embodiment

A second embodiment of the present invention will be described below.

When device drivers are incorporated using the plug-and-play operation and devices are installed in a PC, there is a case in which the default device is determined in accordance with an order of installation of the devices. For example, in Windows (registered trademark) Vista OS, when a printer or a FAX is installed using the plug-and-play operation, a device that is last installed is set as the default device.

In an example of the MFP 3, the MFP 3 has the three functions, i.e., the printer function, the facsimile function, and the scanner function. The OS processes each of the functions as one device, and controls installation of each of the functions. Accordingly, in the example, the plug-and-play operation is performed, in an order of the printer function, the facsimile function, and the scanner function, on the functions, thereby completing installation of the functions in this order. Thus, the FAX (the FAX driver) is set as the default device for normal use in the printer and FAX folder. As a result, in the printer and FAX folder 93, the default device mark is added to the FAX icon 95. As described above, there is a problem that the facsimile function, which is a sub-function, is set as the default device instead of setting the printer function, which is the main function, as the default device. Methods for solving such a problem are illustrated in FIGS. 20, 21A and 21B.

Figure 20:
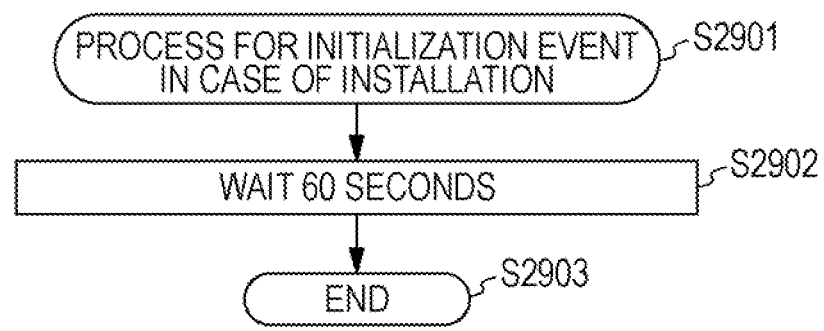
FIG. 20 is a flowchart of a process for an initialization event when the printer driver 50 is installed.

FIG. 20 is a flowchart of a process for an initialization event when the printer driver 50 is installed. A program based on a flow illustrated in FIG. 20 is stored on the HDD 1202, loaded into the RAM 1201, and executed by the CPU 1204. When the MFP 3 is connected to the PC 1 via the network 4, the plug-and-play operation is performed, in an order of the printer function, the facsimile function, and the scanner function, on the functions. When the plug-and-play operation is performed on each of the functions, the process of step S1304 shown in FIG. 9 is performed, thereby installing a driver for the function to the PC 1. For the printer function, installation of the printer driver 50 starts in step S1304. When installation of the printer driver 50 starts, an initialization event PRINTER_EVENT_INITIALIZE in a case of installation occurs in the UI module 35 in the course of an installation process, and the process illustrated in FIG. 20 starts. Referring to FIG. 20, when the process for the initialization event in a case of installation starts (step S2901), an operation of waiting 60 seconds is performed (step S2902), and the process for the initialization event in a case of installation is terminated (step S2903). While the operation of waiting a fixed time is being performed (during a wait time), installation of the FAX driver 150 is completed. Note that, because no interface that processes the initialization event PRINTER_EVENT_INITIALIZE in a case of installation is mounted in the UI module 135 of the FAX driver 150, the initialization event does not occur for the FAX driver ISO. In this manner, the printer function, which is the main function, can be set as the default device (the default function), whereby the problem can be solved. Note that, although the wait time is set to be 60 seconds in the above-described example, the present invention is not limited to the above-described example. Any appropriate time can be set in accordance with the type of device or driver, whereby the method illustrated in FIG. 20 can be realized in various cases.

Note that, although, in the above-described example in which the OS is Windows (registered trademark) Vista OS, a device (function) that is last installed is set as the default device, this depends on a specification of the OS. Accordingly, when the OS is an OS other than Windows (registered trademark) Vista OS, a case can be considered, in which a specification of the OS is different from the specification of Windows (registered trademark) Vista OS. For example, a device (function) that is first installed is set as the default device. It can also be considered that an OS having the following specification exists: in a case in which a device (function) is first installed, even when other devices (functions) are installed after the device (function) is first installed, a state in which the device (function) that is first installed is set as the default device is held. In the above-mentioned OS(hereinafter, referred to as an OS "B"), except in a case in which the user manually changes the setting of the default device, the device (function) that is first installed is set as the default device. For the OS, control using the wait time, which is illustrated in FIG. 20, is implemented not in the UI module 35 of the printer driver 50 but in the UI module 135 of the FAX driver 150. In this manner, the printer function, which is the main function, can be set as the default device, whereby the above-described problem can be solved. Furthermore, a case can also be considered, in which the printer driver 50 and the FAX driver 150 support a plurality of OSs such as "Windows (registered trademark) Vista OS" and "B". In this case, a process of determining the type of each of OSs is implemented in the UI modules 35 and 135, and an appropriate process can be performed in accordance with the type of OS. An implementation method such as a method in which the printer function, which is the main function, is set as the default device in this manner can also be considered. The example of the implementation method is illustrated in FIGS. 21A and 21B.

Figure 21A:
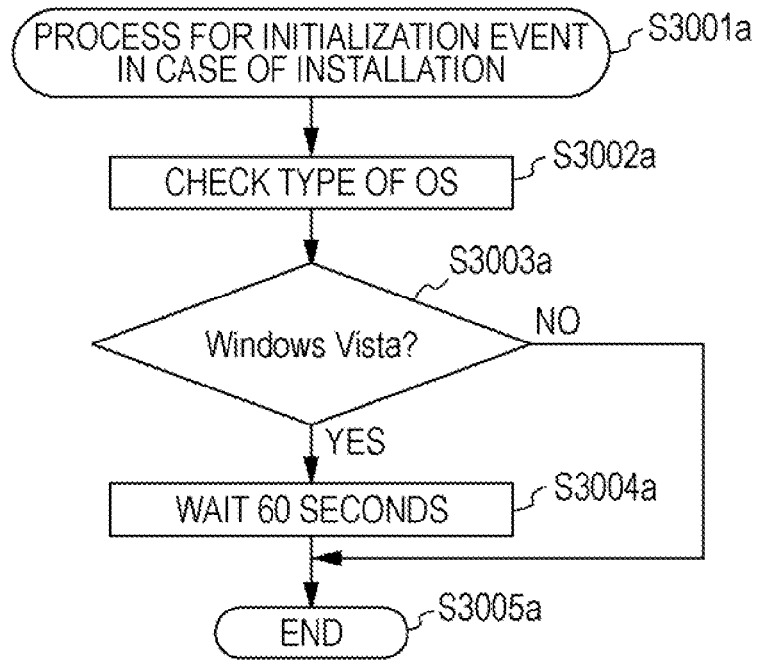
[FIG. 21A]
Figure 21B:
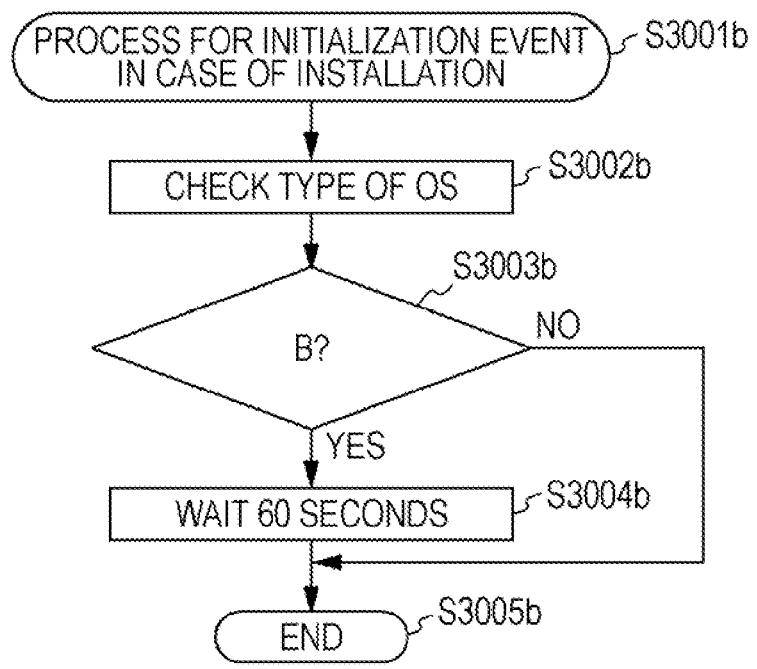
FIG. 21B is a flowchart of a process for the initialization event when the FAX driver ISO is installed.

FIGS. 21A and 21B are a flowchart of a process for an initialization event when the printer driver 50 is installed and a flowchart of a process for an initialization event when the FAX driver 150 is installed, respectively. A program based on each of flows illustrated in FIGS. 21A and 21B is stored on the HDD 1202, loaded into the RAM 1201, and executed by the CPU 1204. When the MFP 3 is connected to the PC 1 via the network 4, the plug-and-play operation is performed, in an order of the printer function, the facsimile function, and the scanner function, on the functions. When the plug-and-play operation is performed on each of the functions, the process of step S1304 shown in FIG. 9 is performed, thereby installing a driver for the function to the PC 1.

In Windows (registered trademark) Vista OS, a driver that is last installed is set as a default printer. In the OS "B", a driver that is first installed is set as the default printer. A device that is set as the default printer differs depending on the type of OS. Accordingly, a process of setting, as the default printer, a printer driver that is supposed to be used as the main driver is performed by determining the type of OS, and by performing a wait process for installation. The process will be described below.

For the printer function, installation of the printer driver 50 starts in step S1304. When installation of the printer driver 50 starts, the initialization event PRINTER_EVENT_INITIALIZE in a case of installation occurs in the UI module 35 in the course of an installation process, and a process illustrated in FIG. 21A starts. Referring to FIG. 21A, when the process for the initialization event in a case of installation of a driver starts (step S3001a), the type of OS is checked (step S3002a). When the OS is "Windows (registered trademark) Vista OS" (step S3003a), an operation of waiting 60 seconds is performed (step S3004a), and the process for the initialization event in a case of installation is terminated (step S3005a). While the operation of waiting 60 seconds is being performed for the printer driver 50 (during a wait time), installation of the FAX driver 150 is completed. In this case, the printer driver 50 is set as the default printer. When it is determined in step S3003a that the OS is an OS other than "Windows (registered trademark) Vista OS" (which includes a case in which the OS is "B"), the process proceeds to step S3005a, and the process for the initialization event in a case of installation is terminated.

For the facsimile function, installation of the FAX driver 150 starts in step S1304. When installation of the FAX driver 150 starts, the initialization event PRINTER_EVENT_INITIALIZE in a case of installation occurs in the UI module 135 in the course of an installation process, and a process illustrated in FIG. 21B starts. Referring to FIG. 21B, when the process for the initialization event in a case of installation of a driver starts (step S3001b), the type of OSis checked (step S3002b). When the OS is "B" (step S3003b), an operation of waiting 60 seconds is performed (step S3004b), and the process for the initialization event in a case of installation is terminated (step S3005b). While the operation of waiting 60 seconds is being performed for the FAX driver 150 (during a wait time), installation of the printer driver 50 is completed. In this case, the printer driver 50 is set as the default printer. When it is determined in step S3003b that the OS is an OS other than "B" (which includes a case in which the OS is "Windows (registered trademark) Vista OS"), the process proceeds to step S3005b, and the process for the initialization event in a case of installation is terminated.

As described above, when the printer driver 50 and the FAX driver 150 support a plurality of OSs such as "Windows (registered trademark) Vista OS" and "B", the printer function, which is the main function, can be set as the default device, whereby the problem can be solved. Note that, although the wait time is set to be 60 seconds in the above-described example, the present invention is not limited to the abovedescribed example. Any appropriate time can be set in accordance with the type of device or driver, whereby the methods illustrated in FIGS. 21A and 21B can be realized in various cases.

Examples of the methods for solving the above-described problem using a wait time are described with reference to FIG. 20, and FIGS. 21A and 21B. However, another method for solving the problem will be described with reference to FIG. 22.

Figure 22:
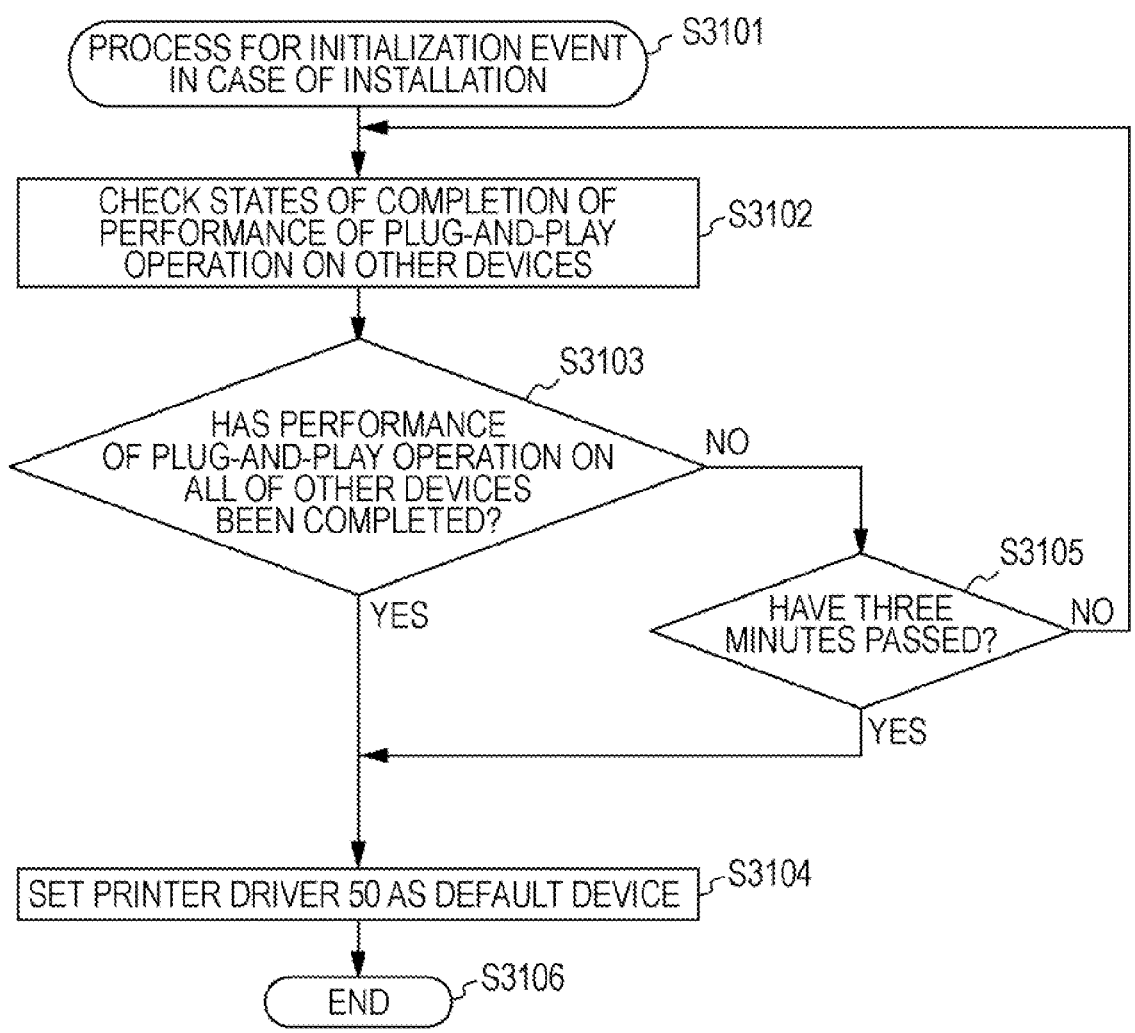
FIG. 22 is a flowchart of a process for the initialization event when the printer driver 50 is installed.

FIG. 22 is a flowchart of a process for an initialization when the printer driver 50 is installed. A program based on a flow illustrated in FIG. 22 is stored on the HDD 1202, loaded into the RAM 1201, and executed by the CPU 1204. When the MFP 3 is connected to the PC 1 via the network 4, the plug-and-play operation is performed, in an order of the printer function, the facsimile function, and the scanner function, on the functions. When the plug-and-play operation is performed on each of the functions, the process of step S1304 shown in FIG. 9 is performed, thereby installing a driver for the function to the PC 1. For the printer function, installation of the printer driver 50 starts in step S1304. When installation of the printer driver 50 starts, the initialization event PRINTER_EVENT_INITIALIZE in a case of installation occurs in the UI module 35 in the course of an installation process, and a process illustrated in FIG. 22 starts. Referring to FIG. 22, the process for the initialization event in a case of installation starts (step S3101). When the process for the initialization event starts, states of completion of performance of the plug-and-play operation on the other devices or functions (the facsimile function and the scanner function in this example) are checked using CMP_WaitNoPendingInstallEvents, which is exported from a library "setupapi.dll" that is one of components of the OS(S3102). When performance of the plug-and-play operation on all of the other devices or functions has been completed (step S3103), SetDefaultPrinter API of the OSis called, thereby setting the printer function, i.e., the printer driver 50, is as the default device (step S3104). Then, the process for the initialization event in a case of installation is terminated (step S3106). Because it is determined in step S3103 that performance of the plug-and-play operation on all of the other devices or functions has been completed, it can be known that installation of the FAX driver 150 is already completed at this point in time. In a case in which it is determined in step S3103 that performance of the plug-and-play operation on all of the other devices or functions has not been completed, when three minutes have passed after the process for the initialization event in a case of installation started, the process proceeds to step S3104. In step S3105, when three minutes have not passed after the process for the initialization event in a case of installation started, the process proceeds to step S3102. Three minutes in step S3105 is used as a reference for determination in a case in which a time taken to install devices (drivers) using the plug-and-play operation is longer than an estimated time because of a certain reason such as an error. Furthermore, any appropriate time can be set as the reference for determination in accordance with the type of device or driver. Note that, because no interface that processes the initialization event PRINTER_EVENT_INITIALIZE in a case of installation is mounted in the UI module 135 of the FAX driver 150, the initialization event does not occur for the FAX driver 150. In this manner, the printer function, which is the main function, can be set as the default device, whereby the above-described problem can be solved.

Note that, in the examples illustrated in FIGS. 20, 21A, 21B and 22, PRINTER_EVENT_INITIALIZE is utilized as an initialization event in a case of installation. However, the present invention is not limited to the examples. The present invention can also be realized using another method, e.g., DIF_FINISHINSTALL_ACTION that is a function of a Co-installer.

The user can set, using a manual operation, any printer (printer driver) or any FAX (FAX driver) in the printer and FAX folder 93 as the default device for normal use. Accordingly, in a case other than a case of installation of a device, it is considered that the setting of the default device for normal use is changed by the above-mentioned manual operation performed by the user. Also in this case, a device name that is to be displayed in the device name display part of the device management application 80 is determined using the process of determining a device name, which is illustrated in FIGS. 12 and 13, and the device name is displayed. Furthermore, also in this case, a printer queue folder that is to be displayed in accordance with the flow illustrated in FIG. 19A and a print setting dialog that is to be displayed in accordance with the flow illustrated in FIG. 19B are determined using the process of determining a target device, which is illustrated in FIG. 16, and the printer queue folder and the print setting dialog are displayed.

A case such as each of the cases illustrated in FIGS. 20, 21A and 21B, and 22, i.e., a case in which the printer function that is the main function is set as the default device when a device (a device driver) is installed, can be considered. In this case, for example, when installation is performed, a setting of the default device is set. When the setting of the default device is kept even after the installation was performed, a friendly name of the printer driver 50 is displayed in the device name display part of the device management application 80. For example, after installation is performed, the FAX driver 150 for the facsimile function that is a sub-function is set as the default device using a manual operation performed by the user. In this case, a friendly name of the FAX driver 150 is displayed in the device name display part of the device management application 80. As described above, as circumstances demand, a name of the main function of a device can he displayed in the device name display part of the device management application 80, or a name of the default device that is set in accordance with the intention of the user can be displayed in the device name display part of the device management application 80. As a result, the peripheral-device control system that has an excellent operability can be realized. Furthermore, a case can also be considered, in which a printer queue button or a print setting button is pressed on the device management 80. Also in this case, similarly, as circumstances demand, a printer queue folder or a print setting dialog for the main function of a device can be displayed, or a printer queue folder or a print setting dialog for the default device that is set in accordance with the intention of the user can be displayed. As a result, the peripheral-device control system that has a more excellent operability can be realized.

Third Embodiment

In the second embodiment, an example is described, in which, in the MFP 3 having a printer function, a facsimile function, and a scanner function, either the printer function (the printer driver 50) or the facsimile function (the FAX driver 150) is set as the default device. The problem in the example and the methods for solving the problem are described. As an example of a case of the MFP 3 other than the above-described case, there is a case in which neither the printer function (the printer driver 50) nor the facsimile function (the FAX driver 150) is set as the default device.

"MFG:ABC;MDL:Kmmn;CLS:PRINTER;CMD:K4; DES:ABC Kmmn;ATRB:Main" indicates a device ID. The device ID is a device ID of the printer function of the MFP 3, and the PC 1 can obtain the device ID from the MFP 3 via the network 4. The device ID indicates the following information:

Manufacturer (MFG:): ABC
Model (MDL:): Kmmn
Class (CLS:): PRINTER
Command (CMD:): K4 (a print control command that is a private command of ABC Corporation)
Description (DES:): ABC Kmmn
Attribute (ATRB:): Main The attribute (ATRB:) indicates an attribute of the printer function of the MFP 3, and "Main" that is set indicates that the function, i.e., the printer function, is the main function. Note that, although detailed description is omitted in a third embodiment, a device ID of the facsimile function of the MFP 3 includes information "ATRB:Sub", and "Sub" is set in the attribute (ATRB:). Here, "Sub" that is set indicates that the function, i.e., the facsimile function, is a sub-function.

Figure 23:
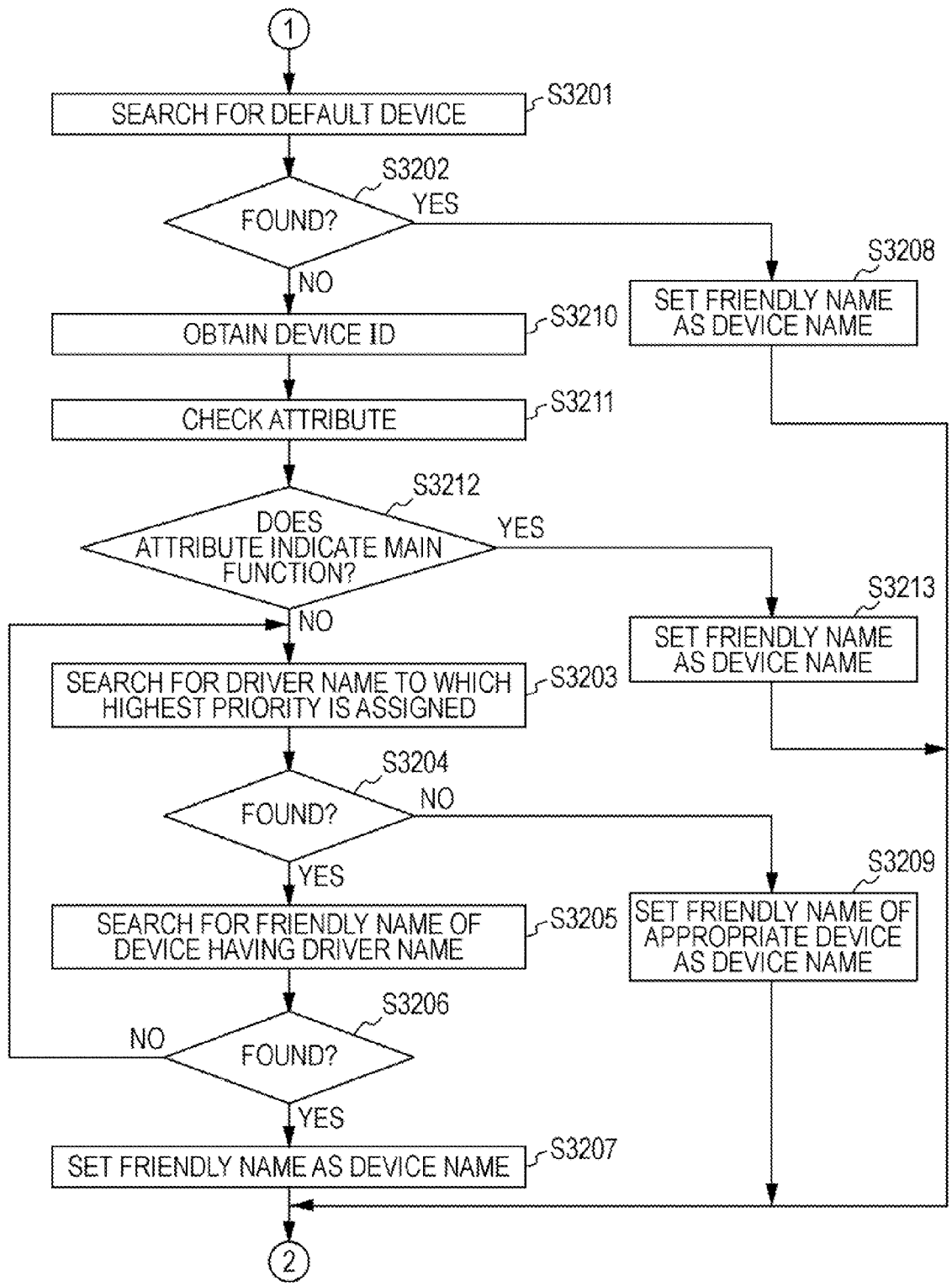
FIG. 23 is a flowchart of a process of determining a device name.

FIG. 23 is a flowchart of a process of determining a device name. A program based on a flow illustrated in FIG. 23 is stored on the HDD 1202, loaded into the RAM 1201, and executed by the CPU 1204. When it is determined in step S1604 shown in FIG. 12 that the number of devices (drivers) that are associated with the device management application 80 is two or more, the process proceeds to step S3201 shown in FIG. 23. Then, search for the default device among the devices (drivers) that are associated with the device management application 80 is performed (step S3201). Whether or not the default device has been found among the devices (drivers) that are associated with the device management application 80 is determined (step S3202). When it is determined that the default device has been found, a friendly name of the device (driver) is set as a device name (step S3208). Then, the process proceeds to step S1611 shown in FIG. 12, and the process of determining a device name is terminated. When it is determined in step S3202 that the default device has not been found among the devices (drivers) which are associated with the device management application 80, the process proceeds to step S3210. For example, a case in which the printer icon 98 (a driver made by another company) is set as the default device also corresponds to the above-mentioned case. In step S3210, the above-described device ID is obtained, and the attribute is checked (step S3211). When the attribute indicates the main function (step S3212), a friendly name of the device (driver) is set as a device name (step S3213). Then, the process proceeds to step S1611 shown in FIG. 12, and the process of determining a device name is terminated. When it is determined in step S3212 that the attribute does not indicate the main function, the <dm:driverName> elements and the <dm:order> elements that are provided in the <dm:priorityOrder> elements shown in FIG. 8 are checked. Then, among the devices (drivers) that are associated with the device management application 80, search for a driver name to which a highest priority is assigned is performed (step S3203). When a driver name to which a highest priority is assigned has been found (step S3204), search for a friendly name of a device (driver) having the driver name to which a highest priority is assigned is performed among the devices (drivers) that are associated with the device management application 80 (step S3205). Whether or not, among the devices (drivers) that are associated with the device management application 80, a friendly name of a device (driver) having the driver name to which a highest priority is assigned has been found is determined (step S3206). When it is determined that a friendly name of a device (driver) having the driver name to which a highest priority is assigned has been found, the friendly name is set as a device name (step S3207). Then, the process proceeds to step S1611 shown in FIG. 12, and the process of determining a device name is terminated. When it is determined in step S3206, among the devices (drivers) that are associated with the device management application 80, no friendly name of a device (driver) having the driver name to which a highest priority is assigned has been found, the process returns to step S3203. Then, search for a driver name to which the next highest priority is assigned is performed. When it is determined in step S3204 that no driver name to which the next highest priority is assigned has been found, an appropriate device (driver) is selected from among the devices (drivers) that are associated with the device management application 80. Then, a friendly name of the device (driver) is set as a device name (step S3209). After that, the process proceeds to step S1611 shown in FIG. 12, and the process of determining a device name is terminated. In this manner, the attribute in the device ID is checked, and a friendly name of the main function (the printer driver 50 for the printer function of the MFP 3 in this example) is displayed as a device name in the device name display part of the device management application 80. Using the above-described manner, the problem that is described in the second embodiment can be solved, and the operability for users can be improved.

Figure 24:
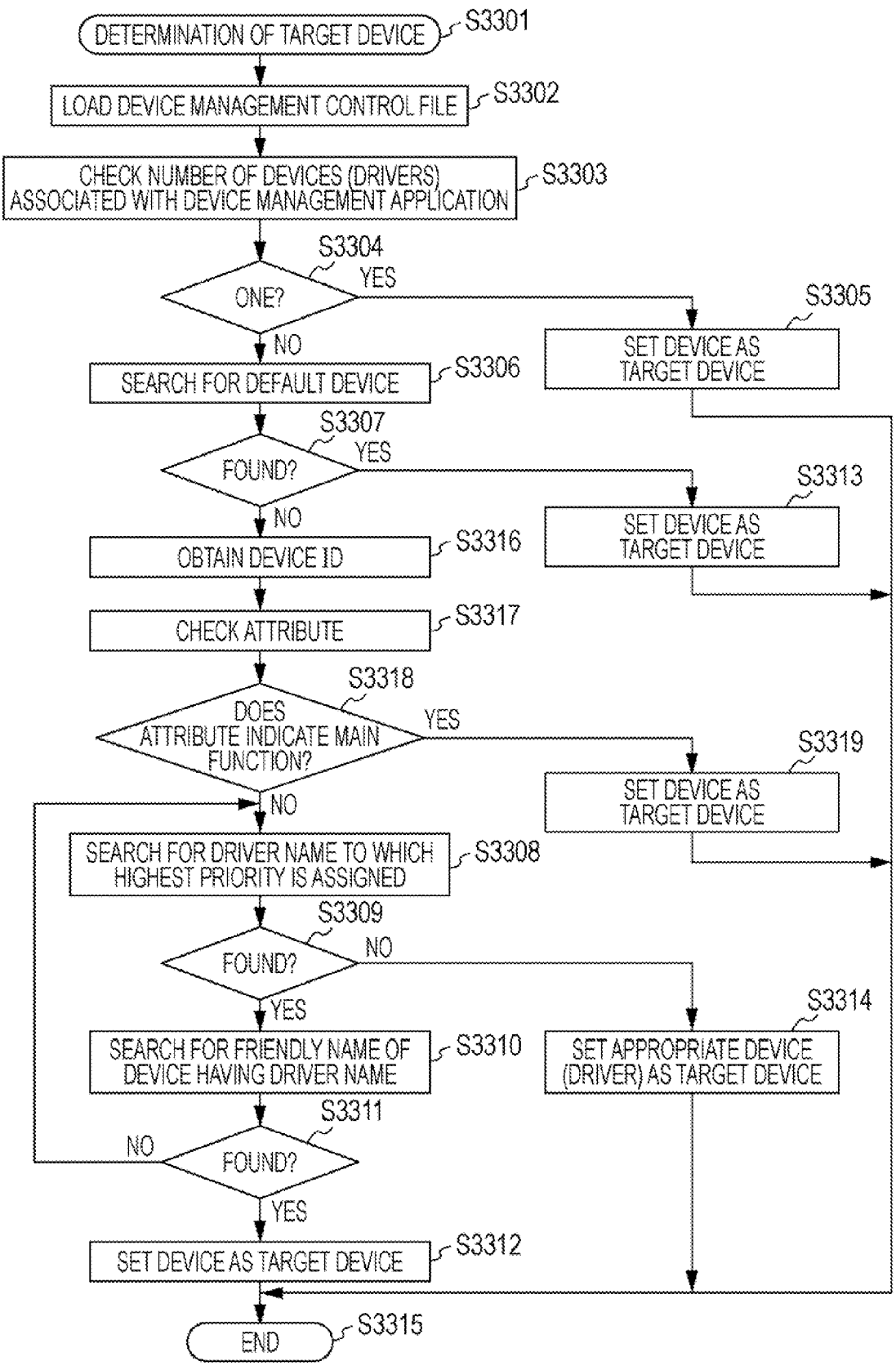
FIG. 24 is a flowchart of a process of determining a target device.

FIG. 24 is a flowchart of a process of determining a target device. A program based on a flow illustrated in FIG. 24 is stored on the HDD 1202, loaded into the RAM 1201, and executed by the CPU 1204. When the printer queue button 42 or the print setting button 43, which are shown in FIG. 7A, is pressed, referring to FIG. 24, the process of determining a target device starts (step S3301). The deice management control file that was saved in step S1405 shown in FIG. 10 is loaded (step S3302), and the number of devices (drivers) that are associated with the device management application 80 is checked (step S3303). When the number of devices (drivers) is one (step S3304), the device (driver) is set as a target device (step S3305), and the process of determining a target device is terminated (step S3315). When it is determined in step S3304 that the number of devices (drivers) that are associated with the device management application 80 is two or more, search for the default device among the devices (drivers) that are associated with the device management application 80 is performed (step S3306). Whether or not the default device has been found among the devices (drivers) that are associated with the device management application 80 is determined (step S3307). When it is determined that the default device has been found, the device (driver) is set as a target device (step S3313). Then, the process proceeds to step S3315, and the process of determining a target device is terminated. When it is determined in step S3307 that no default device has been found among the devices (drivers) that are associated with the device management application 80, the process proceeds to step S3316. For example, a case in which the printer icon 98 (a driver made by another company) is set as the default device also corresponds to the above-mentioned case. In step S3316, the above-described device ID is obtained, and the attribute is checked (step S3317). When the attribute indicates the main function (step S3318), the device (driver) is set as a target device (step S3319). Then, the process proceeds to step S3315, and the process of determining a target device is terminated. When it is determined in step S3318 that the attribute does not indicate the main function, the <dm:driverName> elements and the <dm:order> elements that are provided in the <dm:priorityOrder> elements shown in FIG. 8 are checked. Then, among the devices (drivers) that are associated with the device management application 80, search for a driver name to which a highest priority is assigned is performed (step S3308). When a driver name to which a highest priority is assigned has been found (step S3309), search for a friendly name of a device (driver) having the driver name to which a highest priority is assigned is performed among the devices (drivers) that are associated with the device management application 80 (step S3310). Whether or not, among the devices (drivers) that are associated with the device management application 80, a friendly name of a device (driver) having the driver name to which a highest priority is assigned has been found is determined (step S3311). When it is determined that a friendly name of a device (driver) having the driver name to which a highest priority is assigned has been found, the device (driver) having the friendly name is set as a target device (step S3312). Then, the process proceeds to step S3315, and the process of determining a target device is terminated. When it is determined in step S3311 that, among the devices (drivers) which are associated with the device management application 80, no friendly name of a device (driver) having the driver name to which a highest priority is assigned has been found, the process returns to step S3308. Then, search for a driver name to which the next highest priority is assigned is performed. When it is determined in step S3309 that no driver name to which the next highest priority is assigned has been found, an appropriate device (driver) is selected from among the devices (drivers) that are associated with the device management application 80, and the device (driver) is set as a target device (step S3314). Then, the process proceeds to step S3315, and the process of determining a target device is terminated. In this manner, the attribute in the device ID is checked, and a device (driver) for the main function (the printer driver 50 for the printer function of the MFP 3 in this example) is set as a target device. Then, when the printer queue button 42 is pressed, a printer queue folder of the device (driver) is displayed. When the print setting button 43 is pressed, a print setting dialog of the device (driver) is displayed. Using the above-described manner, the problem that is described in the second embodiment can be solved, and the operability for users can be improved. Note that, as information that is used to set a device as a target device, for example, a friendly name can be utilized. However, the present invention is not limited to the above-described example using a friendly name. Any information with which a device can be identified can be utilized.

Furthermore, the present invention can be achieved by performing the following reading process. A storage medium on which a program code of software that realizes the functions of the above-described embodiments is provided in a system or an apparatus. A computer (a CPU, a microprocessor unit (MPU), or the like) of the system or apparatus performs a process of reading the program code that is stored on the storage medium, in this case, the program code that is read from the storage medium realizes the functions of the above-described embodiments. Accordingly, the program code and the storage medium on which the program code is stored constitute the present invention.

Additionally, as a matter of course, the functions of the above-described embodiments can be realized not only by executing the program code that is read by the computer but also using the following manner. An OS that operates on the computer or the like performs some of or all of practical processes in accordance with instructions in the program code, and the functions of the above-described embodiments can be realized using the processes.

In the embodiments of the present invention, a device management such as the device management application shown in FIGS. 7A and 7B is provided as an example of the application 80. However, the application 80 is not limited to the example. The present invention can be realized using any application having similar functions, and any application having similar functions is effective.

In the embodiments of the present invention, a color inkjet printer is used as an example of the printer. The printer is not limited to the example. Any printer such as a monochrome laser beam printer (LBP) can be used.

In the embodiments of the present invention, personal computers are provided as examples of the information processing apparatuses. However, the information processing apparatuses are not limited to the examples. The present invention can be realized using any information processing apparatus (terminal) that can be used in a similar manner, such as a digital versatile disc (DVD) player, a game player, a set-top box, or an Internet appliance. Any information processing apparatus (terminal) is effective.

In the embodiments of the present invention, a printer is used as an example of a peripheral device. However, in addition, any one of a copier, a facsimile machine, a scanner, a digital camera, a device having a multiple function of a copier, a facsimile machine, a scanner, and a digital camera, and so forth can be applied as the peripheral device in the present invention.

In the embodiments of the present invention, an OS that is equivalent to Windows (registered trademark) Vista OS is used as an example of the OS. The OS is not limited to the example. Any OS can be used.

In the embodiments of the present invention, Ethernet (registered trademark) is used as an example of the network configuration of the network 4. However, the network configuration of the network 4 is not limited to the example. Any other network configuration can be used.

In the embodiments of the present invention, Ethernet (registered trademark) is used as an example of the interface among the PC 1, the MFP 3 and the printer 7. However, the interface is not limited to the example. Any interface such as a wireless LAN, IEEE1394, Bluetooth, or USB can be used.

In the embodiments of the present invention, a WSD protocol is used as an example of the protocol for web services. The protocol for web services is not limited to the example. Any protocol such as an IHV-specific protocol can be used.

In the embodiments of the present invention, an example in which a device name that is to be displayed in the device name display part of the device management application is automatically selected and an example in which a target device that is to be used when the printer queue button or the print setting button is pressed is automatically selected are described. The present invention is not limited to the examples. For example, when activation of an application, provision of a link to a website, provision of a service, or the like is performed using the device management application, a device name or a target device can be automatically selected and set.

According to the embodiments of the present invention, the following positive effects can be obtained.

(1) A system can be proposed, which automatically fits to an environment in which a user uses the system, which can display an appropriate device name in a device name display part of a device management application, and which has an excellent operability.

(2) A system can be proposed, which automatically fits to an environment in which a user uses the system, which can perform an appropriate function using a device management application, and which has an excellent operability.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2008-271045, filed Oct. 21, 2008, and No. 2009-151477, filed Jun. 25, 2009, which are hereby incorporated by reference herein in their entirety.

The invention claimed is:

1. An information processing apparatus comprising:
a determination unit configured to determine whether or not a default device exists among devices that are associated with a device management application being executed on the information processing apparatus, wherein the default device is set by a user to any device displayed in a printer folder, and
a display unit configured to display, when it is determined by the determination unit that the default device exists among the devices which are associated with the device management application, a friendly name of the default device in a device name display part of the device management application, and configured to display, when it is determined by the determination unit that no default device exists among the devices which are associated with the device management application, a friendly name of any one of the devices that are associated with the device management application in the device name display part of the device management application,
wherein a device management control file is installed in response to installation of a driver corresponding to any one of the devices to be associated with the device management application, and display contents of the device management application is determined in accordance with the device management control file.

2. An information processing method comprising:
determining whether or not a default device exists among devices that are associated with a device management application being executed on the information processing apparatus, wherein the default device is set by a user to any device displayed in a printer folder, and
displaying, when it is determined that the default device exists among the devices which are associated with the device management application, a friendly name of the default device in a device name display part of the device management application, and displaying, when it is determined that no default device exists among the devices which are associated with the device management application, a friendly name of any one of the devices that are associated with the device management application in the device name display part of the device management application,
wherein a device management control file is installed in response to installation of a driver corresponding to any one of the devices to be associated with the device management application, and display contents of the device management application is determined in accordance with the device management control file.

3. The information processing method according to claim 2, wherein at least one device associated with the device management application includes a device driver of an independent hardware vendor (IHV).

4. The information processing method according to claim 2, further comprising:
searching for a device management control file to install a device management application.

5. The information processing method according to claim 2, further comprising:
searching for a device management control file to install a device management application,
wherein at least one device associated with the device management application includes a device driver of an independent hardware vendor.

6. The information processing method according to claim 2, wherein, the displaying displays, when it is determined that the default device exists among the devices which are associated with the device management application, a friendly name of the default device in the device name display part of the device management application, and the displaying displays, when it is determined that no default device exists among the devices which are associated with the device management application, a friendly name of a device to which a highest priority is assigned from among the devices that are associated with the device management application in the device name display part of the device management application.

7. The information processing method according to claim 2, wherein, the displaying displays, when a driver for a device having a plurality of functions is installed and a main function among the plurality of functions is set as a default function, a friendly name of the device that is associated with the main function in the device name display part of the device management application.

8. The information processing method according to claim 2, wherein, the displaying displays, when an attribute that is added to a device having a plurality of functions indicates a main function, a friendly name of the device that is associated with the main function in the device name display part of the device management application.

9. The information processing method according to claim 2, wherein the device management application displays a printer queue object to open a printer queue folder which displays queued print jobs.

10. The information processing method according to claim 2, further comprising:
determining a number of devices that the device management application associates with,
wherein, when it is determined that the number of devices is two or more, performing determination, and
wherein, when it is determined that the number of devices is one, displaying a friendly name of the one device that is associated with the device management application in the device name display part of the device management application.

11. The information processing method according to claim 2, wherein, displaying, when it is determined that no default device exists among the devices which are associated with the device management application and the device management application associates with both of a printer device and a fax device, a friendly name of the printer device.

12. The information processing method according to claim 2, wherein the default device is displayed with a default device mark on the printer folder as distinguished from other one or more devices.

13. The information processing apparatus according to claim 1, wherein at least one device associated with the device management application includes a device driver of an independent hardware vendor (IHV).

14. The information processing apparatus according to claim 1, further comprising:
a searching unit configured to search for a device management control file to install a device management application.

15. The information processing apparatus according to claim 1, further comprising:
a searching unit configured to search for a device management control file to install a device management application,
wherein at least one device associated with the device management application includes a device driver of an independent hardware vendor.

16. The information processing apparatus according to claim 1, wherein, the display unit displays, when it is determined that the default device exists among the devices which are associated with the device management application, a friendly name of the default device in the device name display part of the device management application, and displays, when it is determined that no default device exists among the devices which are associated with the device management application, a friendly name of a device to which a highest priority is assigned from among the devices that are associated with the device management application in the device name display part of the device management application.

17. The information processing apparatus according to claim 1, wherein, the display unit displays, when a driver for a device having a plurality of functions is installed and a main function among the plurality of functions is set as a default function, a friendly name of the device that is associated with the main function in the device name display part of the device management application.

18. The information processing apparatus according to claim 1, wherein, the display unit displays, when an attribute that is added to a device having a plurality of functions indicates a main function, a friendly name of the device that is associated with the main function in the device name display part of the device management application.

19. The information processing apparatus according to claim 1, wherein the device management application displays a printer queue object to open a printer queue folder which displays queued print jobs.

20. The information processing apparatus according to claim 1, further comprising:
a checking unit configured to determine a number of devices that the device management application associates with,
wherein, when it is determined by the checking unit that the number of devices is two or more, the determination unit performs determination, and
wherein, when it is determined by the checking unit that the number of devices is one, the display unit displays a friendly name of the one device that is associated with the device management application in the device name display part of the device management application.

21. The information processing apparatus according to claim 1, wherein, the display unit displays, when it is determined by the determination unit that no default device exists among the devices which are associated with the device management application and the device management application associates with both of a printer device and a fax device, a friendly name of the printer device.

22. The information processing apparatus according to claim 1, wherein the default device is displayed with a default device mark on the printer folder as distinguished from other one or more devices.

23. A non-transitory computer-readable storage medium storing a computer program which is read and executed by a computer to cause the computer to execute:
determining whether or not a default device exists among devices that are associated with a device management application being executed on the information processing apparatus, wherein the default device is set by a user to any device displayed in a printer folder, and
displaying, when it is determined that the default device exists among the devices which are associated with the device management application, a friendly name of the default device in a device name display part of the device management application, and of displaying, when it is determined that no default device exists among the devices which are associated with the device management application, a friendly name of any one of the devices that are associated with the device management application in the device name display part of the device management application,
wherein a device management control file is installed in response to installation of a driver corresponding to any one of the devices to be associated with the device management application, and display contents of the device management application is determined in accordance with the device management control file.

24. The non-transitory computer-readable storage medium according to claim 23, wherein, displaying, when it is determined that the default device exists among the devices which are associated with the device management application, a friendly name of the default device in the device name display part of the device management application, and, displaying when it is determined that no default device exists among the devices which are associated with the device management application, a friendly name of a device to which a highest priority is assigned from among the devices that are associated with the device management application in the device name display part of the device management application.

25. The non-transitory computer-readable storage medium according to claim 23,
wherein displaying, when a driver for a device having a plurality of functions is installed and a main function among the plurality of functions is set as a default function, a friendly name of the device that is associated with the main function in the device name display part of the device management application.

26. The non-transitory computer-readable storage medium according to claim 23,
wherein, displaying, when an attribute that is added to a device having a plurality of functions indicates a main function, a friendly name of the device that is associated with the main function in the device name display part of the device management application.

27. The non-transitory computer-readable storage medium according to claim 23,
wherein at least one device associated with the device management application includes a device driver of an independent hardware vendor (IHV).

28. The non-transitory computer-readable storage medium according to claim 23, further comprising:
searching for a device management control file to install a device management application.

29. The non-transitory computer-readable storage medium according to claim 23, further comprising:
searching for a device management control file to install a device management application,
wherein at least one device associated with the device management application includes a device driver of an independent hardware vendor.

30. The non-transitory computer-readable storage medium according to claim 23, wherein the device management application displays a printer queue object to open a printer queue folder which displays queued print jobs.

31. The non-transitory computer-readable storage medium according to claim 23, further comprising:
determining a number of devices that the device management application associates with,
wherein, when it is determined that the number of devices is two or more, performing determination, and
wherein, when it is determined that the number of devices is one, displaying a friendly name of the one device that is associated with the device management application in the device name display part of the device management application.

32. The non-transitory computer-readable storage medium according to claim 23, wherein, displaying, when it is determined that no default device exists among the devices which are associated with the device management application and the device management application associates with both of a printer device and a fax device, a friendly name of the printer device.

33. The non-transitory computer-readable storage medium according to claim 23, wherein the default device is displayed with a default device mark on the printer folder as distinguished from other one or more devices.

* * * * *